(12) United States Patent
Proudler et al.

(10) Patent No.: US 7,457,951 B1
(45) Date of Patent: Nov. 25, 2008

(54) DATA INTEGRITY MONITORING IN TRUSTED COMPUTING ENTITY

(75) Inventors: Graeme John Proudler, Bristol (GB); Boris Balacheff, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/979,903

(22) PCT Filed: May 25, 2000

(86) PCT No.: PCT/GB00/02003

§ 371 (c)(1),
(2), (4) Date: Nov. 27, 2001

(87) PCT Pub. No.: WO00/73904

PCT Pub. Date: Dec. 7, 2000

(30) Foreign Application Priority Data

May 28, 1999 (EP) .................................. 99304166

(51) Int. Cl.
*H04L 9/00* (2006.01)
(52) U.S. Cl. ..................... 713/164; 713/194; 726/26
(58) Field of Classification Search ................ 713/200, 713/165, 164; 726/26, 22
See application file for complete search history.

(56) References Cited

U.S. PATENT DOCUMENTS

| | | | | |
|---|---|---|---|---|
| 4,933,969 A | * | 6/1990 | Marshall et al. ............. | 713/177 |
| 5,032,979 A | * | 7/1991 | Hecht et al. ................... | 726/25 |
| 5,144,660 A | * | 9/1992 | Rose .......................... | 713/200 |
| 5,283,828 A | | 2/1994 | Saunders et al. ............ | 713/192 |
| 5,341,422 A | | 8/1994 | Blackledge et al. .......... | 726/5 |
| 5,359,659 A | | 10/1994 | Rosenthal ...................... | 380/4 |
| 5,361,359 A | * | 11/1994 | Tajalli et al. ................... | 726/23 |
| 5,404,532 A | | 4/1995 | Allen et al. ................. | 395/700 |
| 5,421,006 A | | 5/1995 | Jablon et al. ................. | 395/575 |
| 5,440,723 A | | 8/1995 | Arnold et al. ................ | 395/181 |
| 5,448,045 A | * | 9/1995 | Clark .......................... | 235/382 |
| 5,491,750 A | | 2/1996 | Bellare et al. ............... | 713/155 |
| 5,511,184 A | | 4/1996 | Lin ............................ | 710/261 |

(Continued)

FOREIGN PATENT DOCUMENTS

CA  2187855  6/1997

(Continued)

OTHER PUBLICATIONS

U.S. Appl. No. 09/979,902, filed Nov. 27, 2001, Proudler et al.
U.S. Appl. No. 10/080,476, filed Feb. 22, 2002, Proudler et al.
U.S. Appl. No. 10/080,477, filed Feb. 22, 2002, Brown et al.
U.S. Appl. No. 10/080,478, filed Feb. 22, 2002, Pearson et al.

(Continued)

*Primary Examiner*—Gilberto Barron, Jr.
*Assistant Examiner*—Shewaye Gelagay

(57) ABSTRACT

A method of security monitoring of data files in a computer platform is carried out by a trusted component having a processor and trusted memory area. The method comprises creating one or a plurality of data files in an untrusted memory area of said computing platform, for each created data file, periodically generating a digest data by applying a hash function to each data file, storing the digest data in a trusted memory area and for each file periodically comparing a current digest data of the file with a previously generated digest data of the file. Any differences between a previous and a current digest data indicate that a file in the untrusted memory area has been corrupted.

32 Claims, 16 Drawing Sheets

U.S. PATENT DOCUMENTS

| | | | | |
|---|---|---|---|---|
| 5,572,590 | A | | 11/1996 | Chess .............................. 380/4 |
| 5,619,571 | A | | 4/1997 | Sandstrom et al. ............. 380/4 |
| 5,701,343 | A | * | 12/1997 | Takashima et al. ............ 705/51 |
| 5,706,431 | A | | 1/1998 | Otto ........................... 709/221 |
| 5,768,382 | A | * | 6/1998 | Schneier et al. ............. 380/251 |
| 5,774,717 | A | | 6/1998 | Porcaro ...................... 707/202 |
| 5,809,145 | A | | 9/1998 | Slik et al. ..................... 380/25 |
| 5,815,702 | A | | 9/1998 | Kannan et al. .............. 712/244 |
| 5,819,261 | A | * | 10/1998 | Takahashi et al. .............. 707/3 |
| 5,841,868 | A | | 11/1998 | Helbig ....................... 235/380 |
| 5,841,869 | A | | 11/1998 | Merkling et al. ............ 713/164 |
| 5,844,986 | A | | 12/1998 | Davis ........................... 380/4 |
| 5,890,142 | A | | 3/1999 | Tanimura et al. ............. 706/74 |
| 5,892,900 | A | | 4/1999 | Ginter et al. .................. 726/26 |
| 5,892,902 | A | * | 4/1999 | Clark ........................... 726/5 |
| 5,937,159 | A | | 8/1999 | Meyers et al. ............... 713/201 |
| 5,940,513 | A | | 8/1999 | Aucsmith et al. ........... 713/187 |
| 5,958,016 | A | | 9/1999 | Chang et al. ................ 709/229 |
| 5,966,732 | A | * | 10/1999 | Assaf .......................... 711/170 |
| 6,021,510 | A | * | 2/2000 | Nachenberg ................ 714/38 |
| 6,038,667 | A | | 3/2000 | Helbig ........................ 726/16 |
| 6,081,894 | A | | 6/2000 | Mann .......................... 713/188 |
| 6,091,956 | A | | 7/2000 | Hollenberg ............. 455/456.5 |
| 6,098,133 | A | | 8/2000 | Summers et al. ............ 710/107 |
| 6,115,819 | A | | 9/2000 | Anderson ................... 726/20 |
| 6,253,324 | B1 | * | 6/2001 | Field et al. .................. 713/187 |
| 6,253,349 | B1 | * | 6/2001 | Maeda et al. ............... 714/799 |
| 6,266,774 | B1 | | 7/2001 | Sampath et al. ............ 713/201 |
| 6,289,462 | B1 | | 9/2001 | McNabb et al. ............ 713/201 |
| 6,327,533 | B1 | | 12/2001 | Chou ......................... 701/207 |
| 6,327,652 | B1 | | 12/2001 | England et al. ................ 713/2 |
| 6,330,670 | B1 | | 12/2001 | England et al. ................ 713/2 |
| 6,374,250 | B2 | * | 4/2002 | Ajtai et al. .................. 707/101 |
| 6,405,318 | B1 | | 6/2002 | Rowland .................... 713/200 |
| 6,414,635 | B1 | | 7/2002 | Stewart et al. .............. 342/457 |
| 6,507,909 | B1 | | 1/2003 | Zurko et al. ................ 713/164 |
| 6,510,418 | B1 | | 1/2003 | Case et al. .................. 705/26 |
| 6,529,143 | B2 | | 3/2003 | Mikkola et al. .......... 340/995.1 |
| 6,529,728 | B1 | | 3/2003 | Pfeffer et al. ............... 455/418 |
| 6,539,425 | B1 | | 3/2003 | Stevens et al. ............. 709/220 |
| 6,609,199 | B1 | | 8/2003 | DeTreville ................. 713/172 |
| 6,650,902 | B1 | | 11/2003 | Richton ................... 455/456.3 |
| 6,678,827 | B1 | | 1/2004 | Rothermel et al. ............. 726/6 |
| 6,678,833 | B1 | | 1/2004 | Grawrock .................... 713/401 |
| 6,694,434 | B1 | * | 2/2004 | McGee et al. .............. 713/189 |
| 6,697,944 | B1 | | 2/2004 | Jones et al. ................. 713/168 |
| 6,716,101 | B1 | | 4/2004 | Meadows et al. ........... 701/207 |
| 6,757,824 | B1 | | 6/2004 | England ...................... 713/156 |
| 6,772,331 | B1 | | 8/2004 | Hind et al. .................. 713/151 |
| 6,785,015 | B1 | | 8/2004 | Smith et al. ............... 358/1.15 |
| 6,799,270 | B1 | | 9/2004 | Bull et al. ................... 713/153 |
| 6,853,988 | B1 | | 2/2005 | Dickinson et al. ............ 705/75 |
| 6,868,406 | B1 | | 3/2005 | Ogg et al. ................... 705/153 |
| 6,889,325 | B1 | | 5/2005 | Sipman et al. .............. 713/176 |
| 6,948,073 | B2 | | 9/2005 | England et al. ............... 380/26 |
| 2001/0037450 | A1 | | 11/2001 | Metlitski et al. ............ 713/152 |
| 2001/0051515 | A1 | | 12/2001 | Rygaard ..................... 455/410 |
| 2002/0012432 | A1 | | 1/2002 | England et al. ............. 380/231 |
| 2002/0023212 | A1 | | 2/2002 | Proudler ..................... 713/164 |
| 2002/0095454 | A1 | | 7/2002 | Reed et al. .................. 709/201 |
| 2002/0184488 | A1 | | 12/2002 | Amini et al. ................ 713/153 |
| 2003/0018892 | A1 | | 1/2003 | Tello .......................... 713/164 |
| 2003/0037237 | A1 | | 2/2003 | Abgrall et al. .............. 713/166 |

FOREIGN PATENT DOCUMENTS

| | | | |
|---|---|---|---|
| EP | 0 304 033 | A2 | 2/1989 |
| EP | 0465016 | * | 11/1991 |
| EP | 0 580 350 | A1 | 1/1994 |
| EP | 0 825 511 | A2 | 2/1998 |
| EP | 0 849 657 | A1 | 6/1998 |
| EP | 0 465 016 | B1 | 12/1998 |
| EP | 0 895 148 | A1 | 2/1999 |
| EP | 1 030 237 | A1 | 8/2000 |
| EP | 1 056 014 | A1 | 11/2000 |
| GB | 2 336 918 | | 11/1999 |
| GB | 2 353 885 | A | 3/2001 |
| JP | 2001-0016655 | | 1/2001 |
| WO | 93/25024 | | 12/1993 |
| WO | 94/11967 | | 5/1994 |
| WO | 95/24696 | | 9/1995 |
| WO | 95/27249 | | 10/1995 |
| WO | 97/29416 | | 8/1997 |
| WO | 98/26529 | | 6/1998 |
| WO | 98/36517 | | 8/1998 |
| WO | 98/40809 | | 9/1998 |
| WO | 98/45778 | | 10/1998 |
| WO | WO 98/45778 | * | 10/1998 |
| WO | WO 95/27249 | * | 10/1999 |
| WO | 00/31644 | | 6/2000 |
| WO | 00/48062 | | 8/2000 |
| WO | 00/48063 | | 8/2000 |
| WO | 00/54125 | | 9/2000 |
| WO | 00/54126 | | 9/2000 |
| WO | 00/73913 | A1 | 12/2000 |
| WO | 01/23980 | | 4/2001 |

OTHER PUBLICATIONS

U.S. Appl. No. 10/080,479, filed Feb. 22, 2002, Pearson et al.
U.S. Appl. No. 10/194,831, filed Jul. 11, 2002, Chen et al.
U.S. Appl. No. 10/206,812, filed Jul. 26, 2002, Proudler.
U.S. Appl. No. 10/208,718, filed Jul. 29, 2002, Chen et al.
"System for Detecting Undesired Alteration of Software," *IBM Technical Disclosure Bulletin*, vol. 32, No. 11, pp. 48-50 (Apr. 1990).
Bontchev, V., "Possible Virus Attacks Against Integrity Programs and How to Prevent Them," *Virus Bulletin Conference*, pp. 131-141 (Sep. 1992).
Radai, Y., "Checksumming Techniques for Anti-Viral Purposes," *Virus Bulletin Conference*, pp. 39-68 (Sep. 1991).
Intel, "Wired for Management Baseline specification v2.0," *Boot Integrity Services Application Programming Interface Version 1.0*, 64 pages (Dec. 28, 1998).
"Information technology-Security techniques-Entity Authentication—Part 3: Mechanisms using digital signature techniques," *ISO/IEC 9798-3*, 6 pages (1998).
"Information technology-Security techniques-Key management—Part 3:Mechanisms using asymmetric techniques," *ISO/IEC 11770-3*, pp. 1-23 and Annexes A-E (1999).
The Trusted Computing Platform Alliance, "Building a Foundation of Trust in the PC," 9 pages, located at Internet address <www.trustedpc.org/home/home.html> (Jan. 2000).
Trusted Computing Platform Alliance, Main Specification Version 1.0, 284 pages (Jan. 25, 2001).
Schneier, B., et al., "Applied Cryptography, Second Edition", John Wiley and Sons, Inc. pp. 34-38.
Anderson, R., et al., "Tamper Resistance—a Cautionary Note," *ISENIX Association, Second USENIX Workshop on Electronic Commerce*, pp. 1-11 (Nov. 18-21, 1996).
Naor, M., et al., "Secure and Efficient Metering," Internet: <http://citeseer.nj.com/naor98secure.html> Sections 1-1.3 (1998).
Yee, B., "Using Secure Coprocessors," Doctoral thesis—Carnegie Mellon University, pp. 1-94 (May 1994).
"HP Virtualvault: Trusted Web-server Platform Product Brief," Internet: <http://www.hp.com/security/products/virtualvault/papers/brief_4.0/> pp. 1-6.
"NIST Announces Technical Correction to Secure Hash Standard," Internet: <http://www.nist.gov/public_affairs/releases/hashstan.htm> pp. 1-2 (Oct. 24, 2002).
"Secure Computing with JAVA™: Now and the Future," Internet: <http://java.sun.com/marketing/collateral/security.html> pp. 1-29 (Apr. 2, 2002).

* cited by examiner

DATA INTEGRITY MONITORING IN TRUSTED COMPUTING ENTITY

CROSS REFERENCE TO RELATED APPLICATIONS

The subject matter of the present application may also be related to the following U.S. patent applications: "Data Event Logging in Computing Platform," Ser. No. 09/979,902, filed Nov. 27, 2001; "Information System," Ser. No. 10/080,476, filed Feb. 22, 2002; "Trusted Computing Environment," Ser. No. 10/080,477, filed Feb. 22, 2002; "Method of and Apparatus for Investigating Transactions in a Data Processing Environment," Ser. No. 10/080,478, filed Feb. 22, 2002; "Method of and Apparatus for Ascertaining the Status of a Data Processing Environment," Ser. No. 10/080,479, filed Feb. 22, 2002; "Trusted Platform Evaluation," Ser. No. 10/194,831, filed Jul. 11, 2002; "Privacy of Data on a Computer Platform," Ser. No. 10/206,812, filed Jul. 26, 2002; and "Method and Apparatus for Locking an Application Within a Trusted Environment," Ser. No. 10/208,718, filed Jul. 29, 2002.

FIELD OF THE INVENTION

The present invention relates to a computing platform, and particularly, although not exclusively, to methods and apparatus for verifying a state of data integrity of the computing platform.

BACKGROUND TO THE INVENTION

Conventional prior art mass market computing platforms include the well-known personal computer (PC) and competing products such as the Apple Macintosh™, and a proliferation of known palm-top and laptop personal computers. Generally, markets for such machines fall into two categories, these being domestic or consumer, and corporate. A general requirement for a computing platform for domestic or consumer use is a relatively high processing power, Internet access features, and multi-media features for handling computer games. For this type of computing platform, the Microsoft Windows® '95 and '98 operating system products and Intel processors dominate the market.

On the other hand, for business use, there are a plethora of available proprietary computer platform solutions available aimed at organizations ranging from small businesses to multi-national organizations. In many of these applications, a server platform provides centralized data storage, and application functionality for a plurality of client stations. For business use, other key criteria are reliability, networking features, and security features. For such platforms, the Microsoft Windows NT 4.0™ operating system is common, as well as the Unix™ operating system.

With the increase in commercial activity transacted over the Internet, known as "e-commerce", there has been much interest in the prior art on enabling data transactions between computing platforms, over the Internet. However, because of the potential for fraud and manipulation of electronic data, in such proposals, fully automated transactions with distant unknown parties on a wide-spread scale as required for a fully transparent and efficient market place have so far been held back. The fundamental issue is one of trust between interacting computer platforms for the making of such transactions.

There have been several prior art schemes which are aimed at increasing the security and trustworthiness of computer platforms. Predominantly, these rely upon adding in security features at the application level, that is to say the security features are not inherently imbedded in the kernel of operating systems, and are not built in to the fundamental hardware components of the computing platform. Portable computer devices have already appeared on the market which include a smart card, which contains data specific to a user, which is input into a smart card reader on the computer. Presently, such smart cards are at the level of being add-on extras to conventional personal computers, and in some cases are integrated into a casing of a known computer. Although these prior art schemes go some way to improving the security of computer platforms, the levels of security and trustworthiness gained by prior art schemes may be considered insufficient to enable widespread application of automated transactions between computer platforms. Before businesses expose significant value transactions to electronic commerce on a widespread scale, they may require greater confidence in the trustworthiness of the underlying technology.

In the applicant's co-pending International Patent Applications 'Trusted Computing Platform' PCT/GB 00/00528, filed on 15 Feb. 2000, and 'Smartcard User Interface for Trusted Computing Platform' PCT/GB 00/00752, filed on 3 Mar. 2000, the entire contents of which are incorporated herein by reference, there is disclosed a concept of a 'trusted computing platform' comprising a computing platform which has a 'trusted component' in the form of a built-in hardware and software component. Two computing entities each provisioned with such a trusted component, may interact with each other with a high degree of 'trust'. That is to say, where the first and second computing entities interact with each other the security of the interaction is enhanced compared to the case where no trusted component is present, because A user of a computing entity has higher confidence in the integrity and security of his/her own computer entity and in the integrity and security of the computer entity belonging to the other computing entity.

Each entity is confident that the other entity is in fact the entity which it purports to be;

Where one or both of the entities represent a party to a transaction, e.g. a data transfer transaction, because of the in-built trusted component, third party entities interacting with the entity have a high degree of confidence that the entity does in fact represent such a party The trusted component increases the inherent security of the entity itself, through verification and monitoring processes implemented by the trusted component.

The computer entity is more likely to behave in the way it is expected to behave.

Prior art computing platforms have several problems which need to be overcome in order to realize the potential of the applicants' above disclosed trusted component concept. In particular, The operating status of a computer system or platform and the status of the data within the platform or system is dynamic and difficult to predict. It is difficult to determine whether a computer platform is operating correctly because the state of the computer platform and data on the platform is constantly changing and the computer platform itself may be dynamically changing.

From a security point of view, commercial computer platforms, in particular client platforms, are often deployed in environments which are vulnerable to unauthorized modification. The main areas of vulnerability include modification by software loaded by a user, or by software loaded via a network connection. Particularly, but not exclusively, conventional computer platforms may be vulnerable to attack by virus programs, with varying degrees of hostility.

Computer platforms may be upgraded or their capabilities extended or restricted by physical modification, i.e. addition or deletion of components such as hard disk drives, peripheral drivers and the like.

In particular, conventional computer platforms are susceptible to attack by computer viruses, of which there are thousands of different varieties. Several proprietary virus finding and correcting applications are known, for example the Dr Solomons™ virus toolkit program, and the Microsoft™ virus guard facility provided within the Windows™ operating system. However, such virus packages protect primarily against known viruses, and new strains of virus are being developed and released into the computing and internet environment on an ongoing basis.

SUMMARY OF THE INVENTION

In one specific form, the invention provides a computer platform with a trusted component which generates integrity metrics describing the integrity of data on the computer platform, which can be reported to a user of the computer platform, or to a third party entity communicating with the computer platform, for example over a network connection.

Suitably the integrity metrics are dynamic metrics, which can provide continuous, or regular monitoring of the computer platform during its operation.

Methods for measuring and reporting the dynamic integrity metrics are operated partly within a trusted component, and partly within a computer platform being monitored by the trusted component.

According to a first aspect of the present invention is provided a method of security monitoring of a computer platform, said method comprising the steps of:
  (i) creating a data file in a memory area of said computing platform;
  (ii) generating a first digest data describing a data content of said data file;
  (iii) waiting a predetermined time period;
  (iv) repeating step (ii) to generate a second digest data; and
  (v) comparing said second digest data with said first digest data.

Preferably if second digest data is identical to said first digest data said steps ii) to v) above are repeated, and if said second digest data is not identical to said first digest data, an error data is stored in said trusted memory area.

Preferably said step of generating a first digest data comprises applying a hash function to said data file to produce a hash function data corresponding to said data file.

Said step of creating a data file in a memory area of said computer platform may comprise copying an existing user data file into a reserved portion of said memory area of said computer platform.

Said step of creating a data file in said memory area may comprise generating a random or pseudo random data in a reserved portion of said memory area of said computer platform.

Preferably step of generating a digest data corresponding to said data file is carried out by an algorithm operating on said computer platform.

Said step of generating a digest data may comprise sending a said data file to a trusted component comprising a trusted processor and a trusted memory area, and generating said digest data by applying an algorithm to said data file in said trusted component.

According to a second aspect of the present invention there is provided a computer entity comprising:
  a computer platform comprising a first data processing means and a first memory means;
  a monitoring component comprising a second data processing means and a second memory means; wherein said monitoring component comprises means for receiving a monitor data, said monitor data describing a content of a plurality of data files stored in said computer platform in said first memory means;
  means for storing said plurality of monitor data in said monitoring component; and
  means for making comparisons of said monitor data,
  wherein said monitoring component receives for each of a plurality of data files, an historical monitor data representing a state of said data file at a previous point in time, and a current monitor data representing a current state of said data file.

Preferably said historical monitor data and said current monitor data are stored in said second memory means of said monitoring component.

Preferably said monitoring component comprises a set of agent code stored in said second data storage means, wherein said set of agent code may be transferred to said first data storage means for operation and control by said first data processing means in said computer platform.

Preferably said monitoring component comprises a dictionary means, said dictionary means comprising a text generator device operable to generate a plurality of text data representing a plurality of words, and said monitoring means transferring said text data to a plurality of said data files created in a reserved area of said first memory means. Preferably said dictionary means is operable to generate a plurality of names identifying said plurality of data files created in said reserved area of said first memory means. Preferably said dictionary means is operable to generate a plurality of names of directories containing said plurality of data files created in said reserved area of said first memory means.

Preferably the computer entity further comprises an agent means, said agent means resident and operating on said computer platform wherein,
  said agent means creates a plurality of said data files in a reserved region of said first memory area;
  said agent means substantially continuously monitors said created data files in said reserved memory region; and
  said agent reports said monitor data describing a content of said data files in said reserved memory region periodically to said monitoring component.

Said computer entity may comprise a random data generator, wherein said random data generator generates random data which is stored in a plurality of said data files created in a reserved region of said first memory area of said computer platform.

Said computer entity may comprise an agent device resident on said computer platform, and a smart card reader device, wherein said agent device communicates with said smart card reader device for receiving a file name data from a smartcard via said smart card reader device, said file name data describing one or a plurality of file names of user data files for which permission to copy said user data files is granted to said agent device.

According to a third aspect of the present invention there is provided a method of security monitoring a computer platform comprising a first data processing means and a first memory means, said method comprising the steps of:

receiving a first monitor data, said first monitor data describing a data content of a data file stored in said computer platform;

storing said first monitor data in a trusted memory area physically and logically distinct from said computer platform;

receiving a second monitor data, said second monitor data describing a data content of said same data file stored in said computer platform;

comparing said first monitor data with said second monitor data; and if said first monitor data differs from said second monitor data, generating an error data.

Preferably said method further comprises the step of generating said monitor data by applying a one-way function algorithm to a data content of said data file.

Preferably an alarm display is generated when a said error data is created.

The method may comprise the step of: comparing said error data against a predetermined measure of error data allowable in a predetermined time, to determine if said error data is statistically significant. If said error data is determined to be statistically significant, an alarm display may be generated indicating an error has occurred in said data file.

The invention includes a method of monitoring a computer platform comprising a first data processing means and first memory means, said method comprising the steps of:

a) allocating a region of said first memory means for use by a monitoring entity comprising a second data processing means and a second memory means;

b) creating in said allocated memory area a plurality of data files, each allocated to said monitoring entity;

c) entering data into said plurality of allocated data files in said reserved memory region;

d) creating for each of said data files a monitor data describing a data content of each of said data file;

e) storing said monitor data in a second memory device, said second memory device being physically and logically distinct from said first memory device;

f) repeating steps d) and e); and g) periodically comparing a recently received said monitor data for said data file with a previously received monitor data for the same said data file.

Said step of entering data into a said data file may comprise: copying an existing data file from an unreserved area of said first memory device into said data file.

Said method may further comprise the step of: assigning a file name of said data file in said reserved memory area said file name being a different file name to a file name of said original user file from said unreserved area of said first memory area from which said data file was copied.

Said method may further comprise the step of: assigning a directory name of a directory used for storing said data file in said reserved memory area said directory name being a different directory name to a directory name of said original user directory from said unreserved area of said first memory area in which said data file was originally located.

Preferably said step of creating a monitor data comprises: applying a one-way function algorithm to data in said data file, to produce said monitor data from said data stored in said data file.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
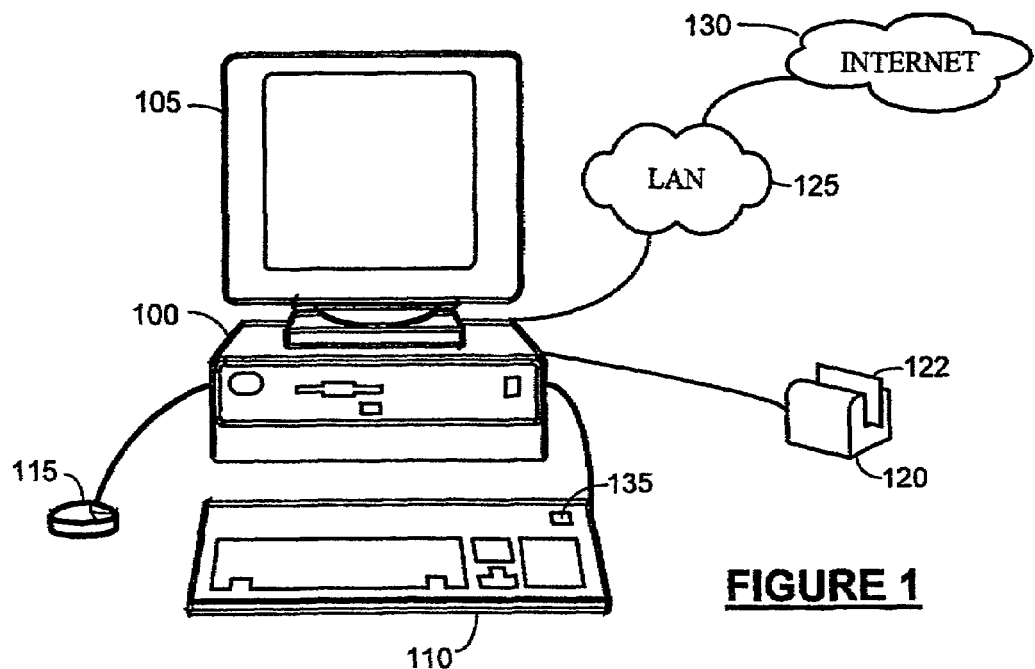
FIG. 1 is a diagram which illustrates a computer system suitable for operating in accordance with the preferred embodiment of the present invention.

There will now be described by way of example a best mode contemplated by the inventors for carrying out the invention, together with alternative embodiments. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific implementations of the present invention comprise a computer platform having a processing means and a memory means, and a monitoring component which is physically associated with the computer platform, and known herein after as a "trusted component" (or "trusted device") which monitors operation of the computer platform by collecting metrics data from the computer platform, and which is capable of verifying to other entities interacting with the computer platform, the correct functioning of the computer platform. Such a system is described in the applicant's copending International Patent Application entitled 'Trusted Computing Platform', No. PCT/GB 00/00528, filed on 15 Feb. 2000, the entire contents of which are incorporated herein by reference. A token device which may be personal to a human user of computer platform interacts with a trusted component associated with the computer platform to verify to the human user the trustworthiness of the computer platform. Appropriate token devices and systems are described in the applicant's copending International Patent Application No. PCT/GB 00/00752, entitled 'Smartcard User Interface for Trusted Computing Platform', filed on 3 Mar. 2000, the entire contents of which are incorporated herein by reference.

A user of a computing entity established a level of trust with the computer entity by use of such a trusted token device. The trusted token device is a personal and portable device having a data processing capability and in which the user has a high level of confidence. The trusted token device may perform the functions of:

verifying a correct operation of a computing platform in a manner which is readily apparent to the user, for example by audio or visual display;

challenging a monitoring component to provide evidence of a correct operation of a computer platform with which the monitoring component is associated; and establishing a level of interaction of the token device with a computing platform, depending on whether a monitoring component has provided satisfactory evidence of a correct operation of the computing entity, and withholding specific interactions with the computer entity if such evidence of correct operation is not received by the token device.

The token device may be requested to take an action, for example by an application resident on the computing platform, or by remote application, or alternatively the token device may initiate an action itself.

In this specification, the term "trusted" when used in relation to a physical or logical component, is used to mean that the physical or logical component always behaves in an expected manner. The behavior of that component is predictable and known. Trusted components have a high degree of resistance to unauthorized modification.

In this specification, the term 'computer entity' is used to describe a computer platform and a monitoring component.

In this specification, the term "computer platform" is used to refer to at least one data processor and at least one data storage means, usually but not essentially with associated communications facilities e.g. a plurality of drivers, associated applications and data files, and which may be capable of interacting with external entities e.g. a user or another computer platform, for example by means of connection to the internet, connection to an external network, or by having an input port capable of receiving data stored on a data storage medium, e.g. a CD ROM, floppy disk, ribbon tape or the like. The term "computer platform" encompasses the main data processing and storage facility of a computer entity.

The term 'pixmap', as used herein, is used broadly to encompass data defining either monochrome or colour (or greyscale) images. Whereas the term 'bitmap' may be associated with a monochrome image only, for example where a single bit is set to one or zero depending on whether a pixel is 'on' or 'off', 'pixmap' is a more general term, which encompasses both monochrome and colour images, where colour images may require up to 24 bits or more to define the hue, saturation and intensity of a single pixel.

By use of a trusted component in each computing entity, there is enabled a level of trust between different computing platforms. It is possible to query such a platform about its state, and to compare it to a trusted state, either remotely, or through a monitor on the computer entity. The information gathered by such a query is provided by the computing entity's trusted component which monitors the various parameters of the platform. Information provided by the trusted component can be authenticated by cryptographic authentication, and can be trusted.

The presence of the trusted component makes it possible for a piece of third party software, either remote or local to the computing entity to communicate with the computing entity in order to obtain proof of its authenticity and identity and to retrieve measured integrity metrics of that computing entity. The third party software can then compare the metrics obtained from the trusted component against expected metrics in order to determine whether a state of the queried computing entity is appropriate for the interactions which the third party software item seeks to make with the computing entity, for example commercial transaction processes.

This type of integrity verification between computing entities works well in the context of third party software communicating with a computing entity's trusted component, but does not provide a means for a human user to gain a level of trustworthy interaction with his or her computing entity, or any other computing entity which that person may interact with by means of a user interface.

In a preferred implementation described herein, a trusted token device is used by a user to interrogate a computing entity's trusted component and to report to the user on the state of the computing entity, as verified by the trusted component.

A "trusted platform" used in preferred embodiments of the invention will now be described. This is achieved by the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user.

If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

FIG. 1 illustrates a host computer system according to the preferred embodiment, in which the host computer is a Personal Computer, or PC, which operates under the Windows NT™ operating system. According to FIG. 1, the computer platform (also here termed host computer) 100 is connected to a visual display unit (VDU) 105, a keyboard 110, a mouse 115 and a smartcard reader 120, and a local area network (LAN) 125, which in turn is connected to the Internet 130. Herein, the smartcard reader is an independent unit, although it may be an integral part of the keyboard. In addition, the host computer has a trusted input device, in this case a trusted switch 135, which is integrated into the keyboard. The VDU, keyboard, mouse, and trusted switch can be thought of as the human/computer interface (HCI) of the host computer. More specifically, the trusted switch and the display, when operating under trusted control, as will be described, can be thought of as a 'trusted user interface'. FIG. 1 also illustrates a smartcard 122 for use in the present embodiment as will be described.

Figure 2:
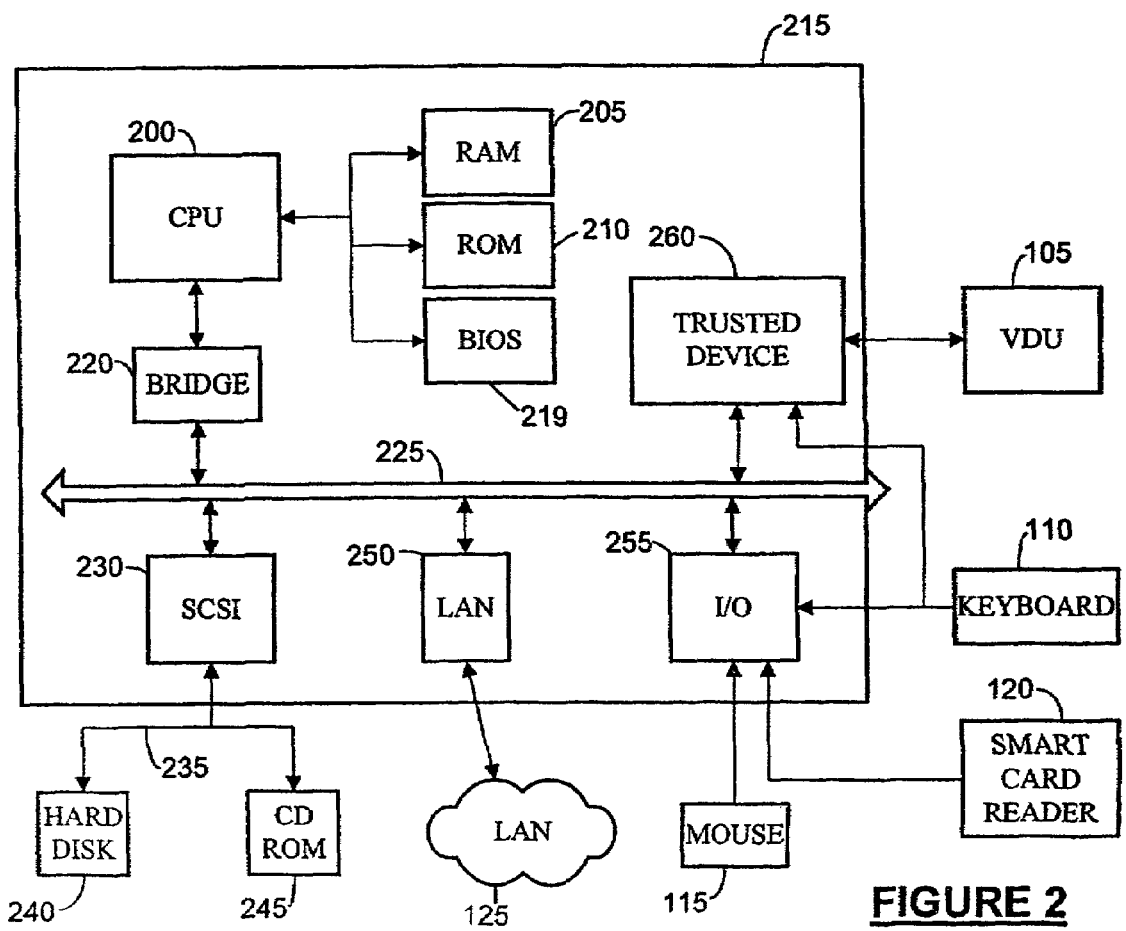
FIG. 2 is a diagram which illustrates a hardware architecture of a computer platform suitable for operating in accordance with the preferred embodiment of the present invention.

FIG. 2 shows a hardware architecture of the host computer of FIG. 1.

According to FIG. 2, the host computer 100 comprises a central processing unit (CPU) 200, or main processor, connected to main memory, which comprises RAM 205 and ROM 210, and to a BIOS memory 219 (which may be a reserved area of main memory) all of which are mounted on a motherboard 215 of the host computer 100. The CPU in this case is a Pentium™ processor. The CPU is connected via a PCI (Peripheral Component Interconnect) bridge 220 to a PCI bus 225, to which are attached the other main components of the host computer 100. The bus 225 comprises appropriate control, address and data portions, which will not be described in detail herein. For a detailed description of Pentium processors and PCI architectures, which is beyond the scope of the present description, the reader is referred to the book, "The Indispensable PC Hardware Handbook", 3rd Edition, by Hans-Peter Messmer, published by Addison-Wesley, ISBN 0-201403994. Of course, the present embodiment is in no way limited to implementation using Pentium processors, Windows™ operating systems or PCI buses.

The other main components of the host computer 100 attached to the PCI bus 225 include: a SCSI (small computer system interface) adaptor connected via a SCSI bus 235 to a hard disk drive 240 and a CD-ROM drive 245; a LAN (local area network) adaptor 250 for connecting the host computer 100 to a LAN 125, via which the host computer 100 can communicate with other host computers (not shown), such as file servers, print servers or email servers, and the Internet 130; an IO (input/output) device 225, for attaching the keyboard 110, mouse 115 and smartcard reader 120; and a trusted device 260. The trusted device handles all standard display functions plus a number of further tasks, which will be described in detail below. 'Standard display functions' are those functions that one would normally expect to find in any standard host computer 100, for example a PC operating under the Windows NT™ operating system, for displaying an image associated with the operating system or application software. The significance of providing the function of a 'trusted display processor' in the trusted device 260 will be described further below. It should be noted that the keyboard 110 has a connection to the IO device 255, as well as a direct connection to the trusted device 260.

All the main components, in particular the trusted display processor 260, are preferably also integrated onto the motherboard 215 of the host computer 100, although, sometimes, LAN adapters 250 and SCSI adapters 230 can be of the plugin type.

The computer entity can be considered to have a logical, as well as a physical, architecture. The logical architecture has a same basic division between the computer platform, and the trusted component, as is present with the physical architecture described in FIGS. 1 and 2 herein. That is to say, the trusted component is logically distinct from the computer platform to which it is physically related. The computer entity comprises a user space being a logical space which is physically resident on the computer platform (the first processor and first data storage means) and a trusted component space being a logical space which is physically resident on the trusted component. In the user space are one or a plurality of drivers, one or a plurality of applications programs, a file storage area; smart card reader; smart card interface; and a software agent which can perform operations in the user space and report back to trusted component. The trusted component space is a logical area based upon and physically resident in the trusted component, supported by the second data processor and second memory area of the trusted component. Monitor 105 receives images directly from the trusted component space. External to the computer entity are external communications networks e.g. the Internet, and various local area networks, wide area networks which are connected to the user space via the drivers (which may include one or more modem ports). An external user smart card inputs into smart card reader in the user space.

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT™, which is typically loaded into main memory from a hard disk drive (not shown).

Clearly, this change from the normal procedure requires a modification to the implementation of the industry standard, whereby the main processor 200 is directed to address the trusted device 260 to receive its first instructions. This change may be made simply by hard-coding a different address into the main processor 200. Alternatively, the trusted device 260 may be assigned the standard BIOS program address, in which case there is no need to modify the main processor configuration.

It is highly desirable for the BIOS boot block to be contained within the trusted device 260. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 260 is a single, discrete component, it is envisaged that the functions of the trusted device 260 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 215, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

After system reset, the trusted device 260 performs a secure boot process to ensure that the operating system of the platform 100 (including the system clock and the display on the monitor) is running properly and in a secure manner. During the secure boot process, the trusted device 260 acquires an integrity metric of the computing platform 100. The trusted device 260 can also perform secure data transfer and, for example, authentication between it and a smart card via encryption/decryption and signature/verification. The trusted device 260 can also securely enforce various security control policies, such as locking of the user interface.

Figure 3:
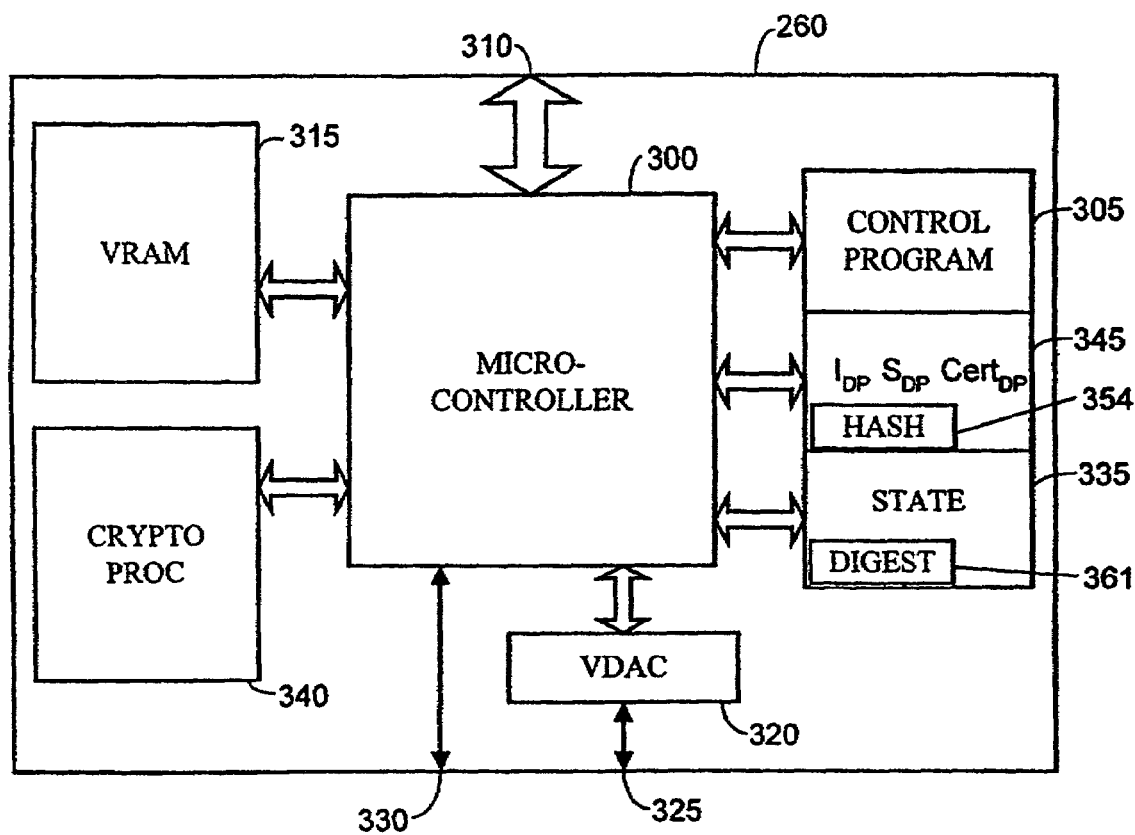
FIG. 3 is a diagram which illustrates a hardware architecture of a trusted device suitable for operating in accordance with the preferred embodiment of the present invention.

According to FIG. 3, the trusted device 260 comprises:

a microcontroller 300, programmed to control the overall operation of the trusted device 260 and to interact with the other elements of the trusted device 260 and other devices on the motherboard 215;

non-volatile memory 305, for example flash memory, containing respective control program instructions (i.e. firmware) for controlling the operation of the microcontroller 300 (alternatively, the trusted device 260 could be embodied in an ASIC, which would typically provide greater performance and cost efficiency in mass production, but would generally be more expensive to develop and less flexible)—functions contained in such control program instructions include a measurement function for acquiring an integrity metric for the platform 100 and an authentication function for authenticating smart card 122;

an interface 310 for connecting the trusted device 260 to the PCI bus for receiving image data (i.e. graphics primitives) from the CPU 200 and also authentication data such as trusted image data from the smartcard 122, as will be described;

frame buffer memory 315, which comprises sufficient VRAM (video RAM) in which to store at least one full image frame (a typical frame buffer memory 315 is 1-2 Mbytes in size, for screen resolutions of 1280×768 supporting up to 16.7 million colours);

a video DAC (digital to analogue converter) 320 for converting pixmap data into analogue signals for driving the (analogue) VDU 105, which connects to the video DAC 320 via a video interface 325;

an interface 330 for receiving signals directly from the trusted switch 135;

volatile memory 335, for example DRAM (dynamic RAM) or more expensive SRAM (static RAM), for storing state information, particularly received cryptographic keys, and for providing a work area for the microcontroller 300;

a cryptographic processor 340, comprising hardware cryptographic accelerators and/or software, arranged to provide the trusted device 260 with a cryptographic identity and to provide authenticity, integrity and confidentiality, guard against replay attacks, make digital signatures, and use digital certificates, as will be described in more detail below; and non-volatile memory 345, for example flash memory, for storing an identifier $I_{DP}$ of the trusted device 260 (for example a simple text string name), a private key $S_{DP}$ of the trusted device 260, a certificate $Cert_{DP}$ signed and provided by a trusted third party certification agency, such as VeriSign Inc., which binds the trusted device 260 with a signature public-private key pair and a confidentiality public-private key pair and includes the corresponding public keys of the trusted device 260.

A certificate typically contains such information, but not the public key of the CA. That public key is typically made available using a 'Public Key Infrastructure' (PKI). Operation of a PKI is well known to those skilled in the art of security.

The certificate $Cert_{DP}$ is used to supply the public key of the trusted device 260 to third parties in such a way that third parties are confident of the source of the public key and that the public key is a part of a valid public-private key pair. As such, it is unnecessary for a third party to have prior knowledge of, or to need to acquire, the public key of the trusted device 260.

The trusted device 260 lends its identity and trusted processes to the host computer and the trusted display processor has those properties by virtue of its tamper-resistance, resistance to forgery, and resistance to counterfeiting. Only selected entities with appropriate authentication mechanisms are able to influence the processes running inside the trusted device 260. Neither an ordinary user of the host computer, nor any ordinary user or any ordinary entity connected via a network to the host computer may access or interfere with the processes running inside the trusted device 260. The trusted device 260 has the property of being "inviolate".

The trusted device 260 is equipped with at least one method of reliably measuring or acquiring the integrity metric of the computing platform 100 with which it is associated. In the present embodiment, the integrity metric is acquired by the measurement function by generating a digest of the BIOS instructions in the BIOS memory. Such an acquired integrity metric, if verified as described above, gives a potential user of the platform 100 a high level of confidence that the platform 100 has not been subverted at a hardware, or BIOS program, level. Other known processes, for example virus checkers, will typically be in place to check that the operating system and application program code has not been subverted.

The measurement function has access to: non-volatile memory 345 for storing a hash program 354 and the private key $S_{DP}$ of the trusted device 260, and volatile memory 335 for storing acquired integrity metric in the form of a digest 361.

In one preferred implementation, as well as the digest, the integrity metric includes a Boolean value, which is stored in volatile memory 335 by the measurement function, for reasons that will become apparent.

Figure 13:
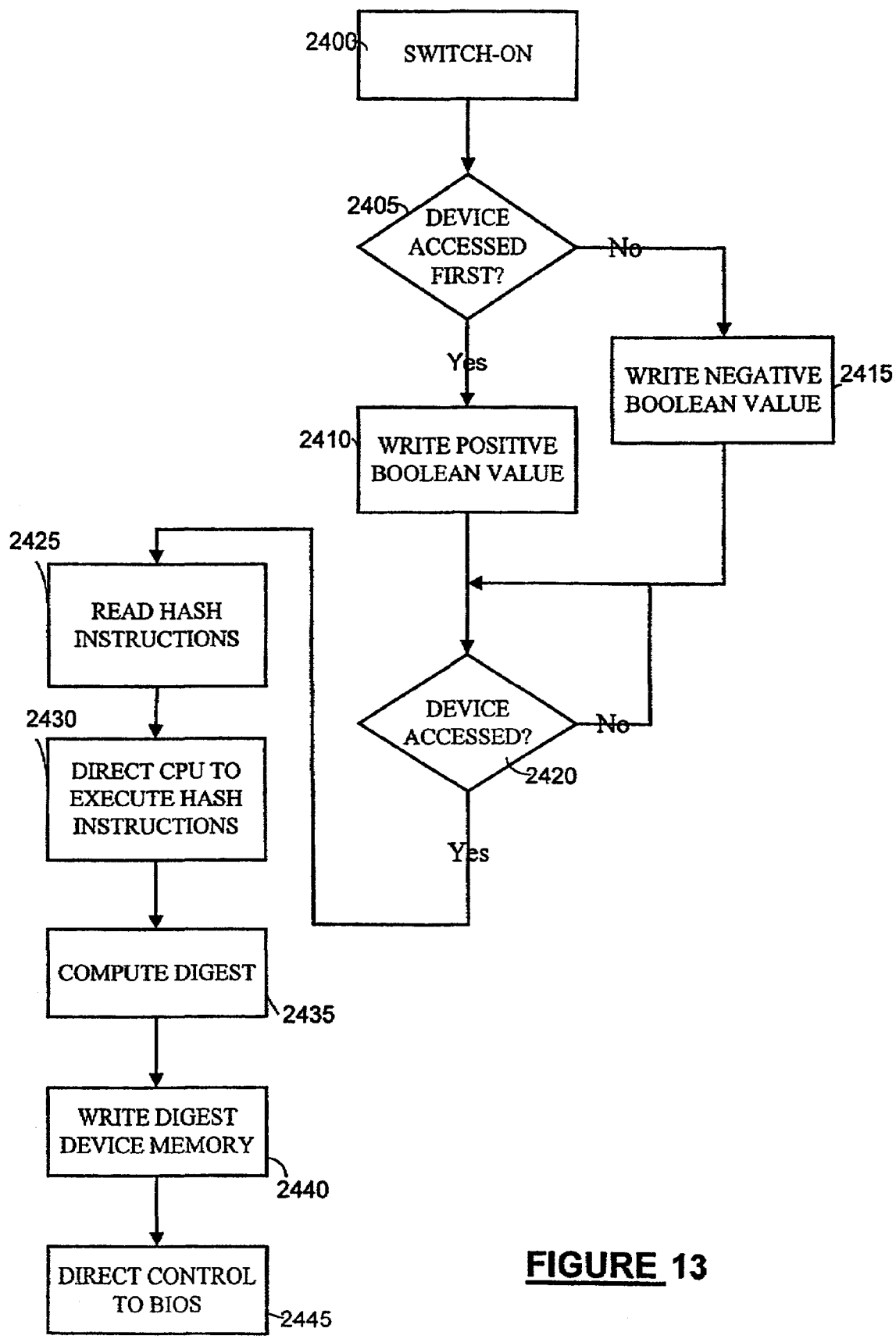
FIG. 13 is a flow diagram which illustrates the steps involved in acquiring an integrity metric of the computing apparatus.

A preferred process for acquiring an integrity metric will now be described with reference to FIG. 13.

In step 2400, at switch-on, the measurement function monitors the activity of the main processor 200 to determine whether the trusted device 260 is the first memory accessed. Under conventional operation, a main processor would first be directed to the BIOS memory first in order to execute the BIOS program. However, in accordance with the present embodiment, the main processor 200 is directed to the trusted device 260, which acts as a memory. In step 2405, if the trusted device 260 is the first memory accessed, in step 2410, the measurement function writes to volatile memory 335 a Boolean value which indicates that the trusted device 260 was the first memory accessed. Otherwise, in step 2415, the measurement function writes a Boolean value which indicates that the trusted device 260 was not the first memory accessed.

In the event the trusted device 260 is not the first accessed, there is of course a chance that the trusted device 260 will not be accessed at all. This would be the case, for example, if the main processor 200 were manipulated to run the BIOS program first. Under these circumstances, the platform would operate, but would be unable to verify its integrity on demand, since the integrity metric would not be available. Further, if the trusted device 260 were accessed after the BIOS program had been accessed, the Boolean value would clearly indicate lack of integrity of the platform.

In step 2420, when (or if) accessed as a memory by the main processor 200, the main processor 200 reads the stored native hash instructions 354 from the measurement function in step 2425. The hash instructions 354 are passed for processing by the main processor 200 over the data bus 225. In step 2430, main processor 200 executes the hash instructions 354 and uses them, in step 2435, to compute a digest of the BIOS memory 219, by reading the contents of the BIOS memory 219 and processing those contents according to the hash program. In step 2440, the main processor 200 writes the computed digest 361 to the appropriate non-volatile memory location 335 in the trusted device 260. The measurement function, in step 2445, then calls the BIOS program in the BIOS memory 219, and execution continues in a conventional manner.

Clearly, there are a number of different ways in which the integrity metric may be calculated, depending upon the scope of the trust required.

The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 260 is a separable component, some such form of interaction is desirable to provide an appropriate logical binding between the trusted device 260 and the platform. Also, although in the present embodiment the trusted device 260 utilises the data bus as its main means of communication with other parts of the platform, it would be feasible, although not so convenient, to provide alternative communications paths, such as hard-wired paths or optical paths. Further, although in the present embodiment the trusted device 260 instructs the main processor 200 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 260 may inspect the proper value of the BIOS digest in the certificate and not pass control to the BIOS if the computed digest does not match the proper value. Additionally, or alternatively, the trusted device 260 may inspect the Boolean value and not pass control back to the BIOS if the trusted device 260 was not the first memory accessed. In either of these cases, an appropriate exception handling routine may be invoked.

Figure 14:
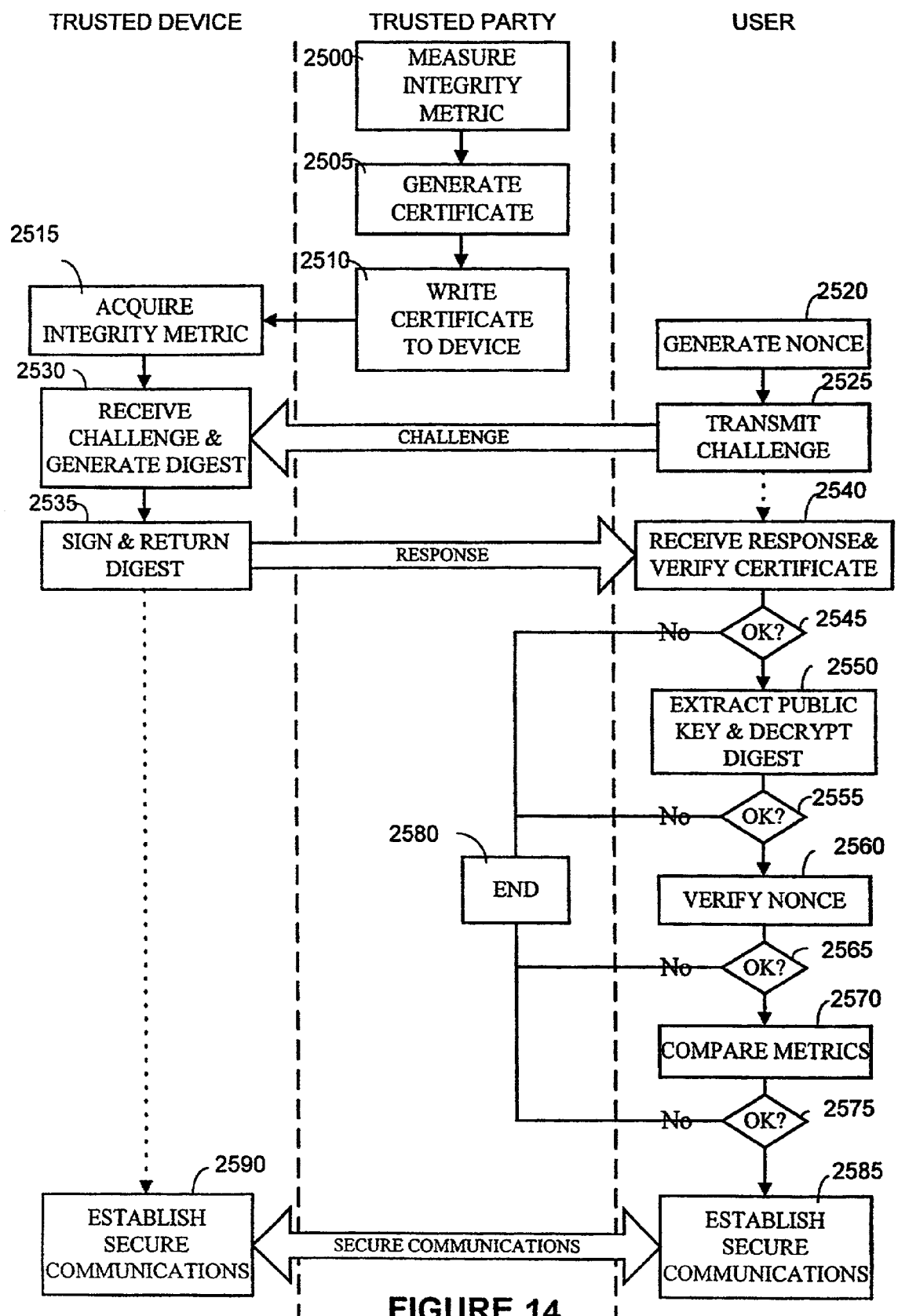
FIG. 14 is a flow diagram which illustrates the steps involved in establishing communications between a trusted computing platform and a remote platform including the trusted platform verifying its integrity.

FIG. 14 illustrates the flow of actions by a TP, the trusted device 260 incorporated into a platform, and a user (of a remote platform) who wants to verify the integrity of the trusted platform. It will be appreciated that substantially the same steps as are depicted in FIG. 14 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is preferred that, for a high level of integrity, the software application would reside on a smart card of the user, who would insert the smart card into an appropriate reader for the purposes of verification. The present preferred embodiments employ such an arrangement.

At the first instance, a TP, which vouches for trusted platforms, will inspect the type of the platform to decide whether to vouch for it or not. This will be a matter of policy. If all is well, in step 2500, the TP measures the value of integrity metric of the platform. Then, the TP generates a certificate, in step 2505, for the platform. The certificate is generated by the TP by appending the trusted device's public key, and optionally its ID label, to the measured integrity metric, and signing the string with the TP's private key.

The trusted device 260 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 2510, the trusted device 260 is initialised by writing the certificate $Cert_{DP}$ into the appropriate non-volatile memory locations of the trusted device 260. This is done, preferably, by secure communication with the trusted device 260 after it is installed in the motherboard 215. The method of writing the certificate to the trusted device 260 is analogous to the method used to initialise smart cards by writing private keys thereto. The secure communications is supported by a 'master key', known only to the TP, that is written to the trusted device (or smart card) during manufacture, and used to enable the writing of data to the trusted device 260; writing of data to the trusted device 260 without knowledge of the master key is not possible.

At some later point during operation of the platform, for example when it is switched on or reset, in step 2515, the trusted device 260 acquires and stores the integrity metric 361 of the platform.

When a user wishes to communicate with the platform, in step 2520, he creates a nonce, such as a random number, and, in step 2525, challenges the trusted device 260 (the operating system of the platform, or an appropriate software application, is arranged to recognise the challenge and pass it to the trusted device 260, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 2530, the trusted device 260 receives the challenge and creates an appropriate response. This may be a digest of the measured integrity metric and the nonce, and optionally its ID label. Then, in step 2535, the trusted device 260 signs the digest, using its private key, and returns the signed digest, accompanied by the certificate $Cert_{DP}$, to the user.

In step 2540, the user receives the challenge response and verifies the certificate using the well known public key of the TP. The user then, in step 2550, extracts the trusted device's 260 public key from the certificate and uses it to decrypt the signed digest from the challenge response. Then, in step 2560, the user verifies the nonce inside the challenge response. Next, in step 2570, the user compares the computed integrity metric, which it extracts from the challenge response, with the proper platform integrity metric, which it extracts from the certificate. If any of the foregoing verification steps fails, in steps 2545, 2555, 2565 or 2575, the whole process ends in step 2580 with no further communications taking place.

Assuming all is well, in steps 2585 and 2590, the user and the trusted platform use other protocols to set up secure communications for other data, where the data from the platform is preferably signed by the trusted device 260.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 260, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

The user's smart card 122 is a token device, separate from the computing entity, which interacts with the computing entity via the smart card reader port 120. A user may have several different smart cards issued by several different vendors or service providers, and may gain access to the internet or a plurality of network computers from any one of a plurality of computing entities as described herein, which are provided with a trusted component and smart card reader. A user's trust in the individual computing entity to which s/he is using is derived from the interaction between the user's trusted smart card token and the trusted component of the computing entity. The user relies on their trusted smart card token to verify the trustworthiness of the trusted component.

Figure 4:
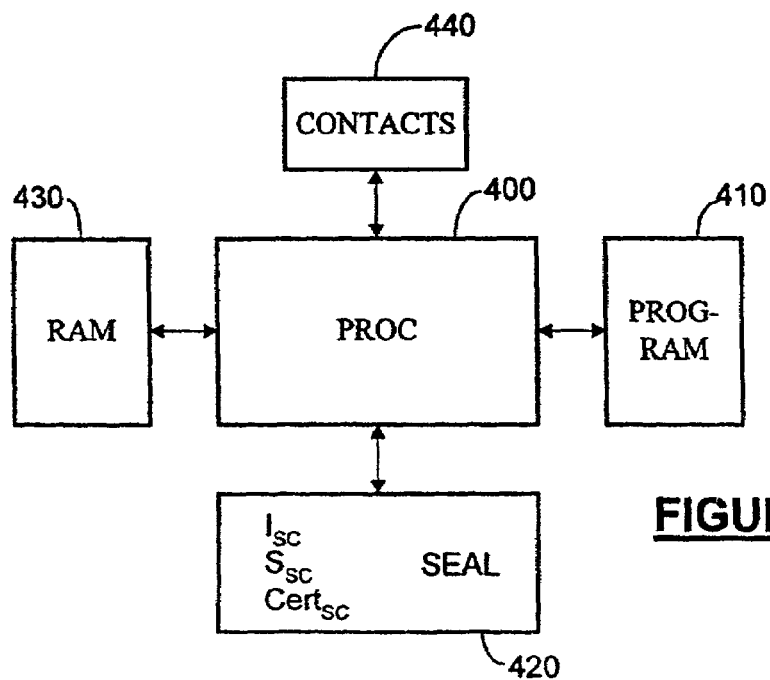
FIG. 4 is a diagram which illustrates a hardware architecture of a smart card processing engine suitable for operating in accordance with the preferred embodiment of the present invention.

The processing engine of a smartcard suitable for use in accordance with the preferred embodiment is illustrated in FIG. 4. The processing engine comprises a processor 400 for enacting standard encryption and decryption functions, and for simple challenge/response operations for authentication of the smart card 122 and verification of the platform 100, as will be discussed below. In the present embodiment, the processor 400 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 420, for example flash memory, containing an identifier $I_{SC}$ of the smartcard 122, a private key $S_{SC}$, used for digitally signing data, and a certificate $Cert_{SC}$, provided by a trusted third party certification agency, which binds the smartcard with public-private key pairs and includes the corresponding public keys of the smartcard 122 (the same in nature to the certificate $Cert_{DP}$ of the trusted display processor 260). Further, the smartcard contains 'seal' data SEAL in the non-volatile memory 420, the significance of which will be discussed further below.

Figure 15:
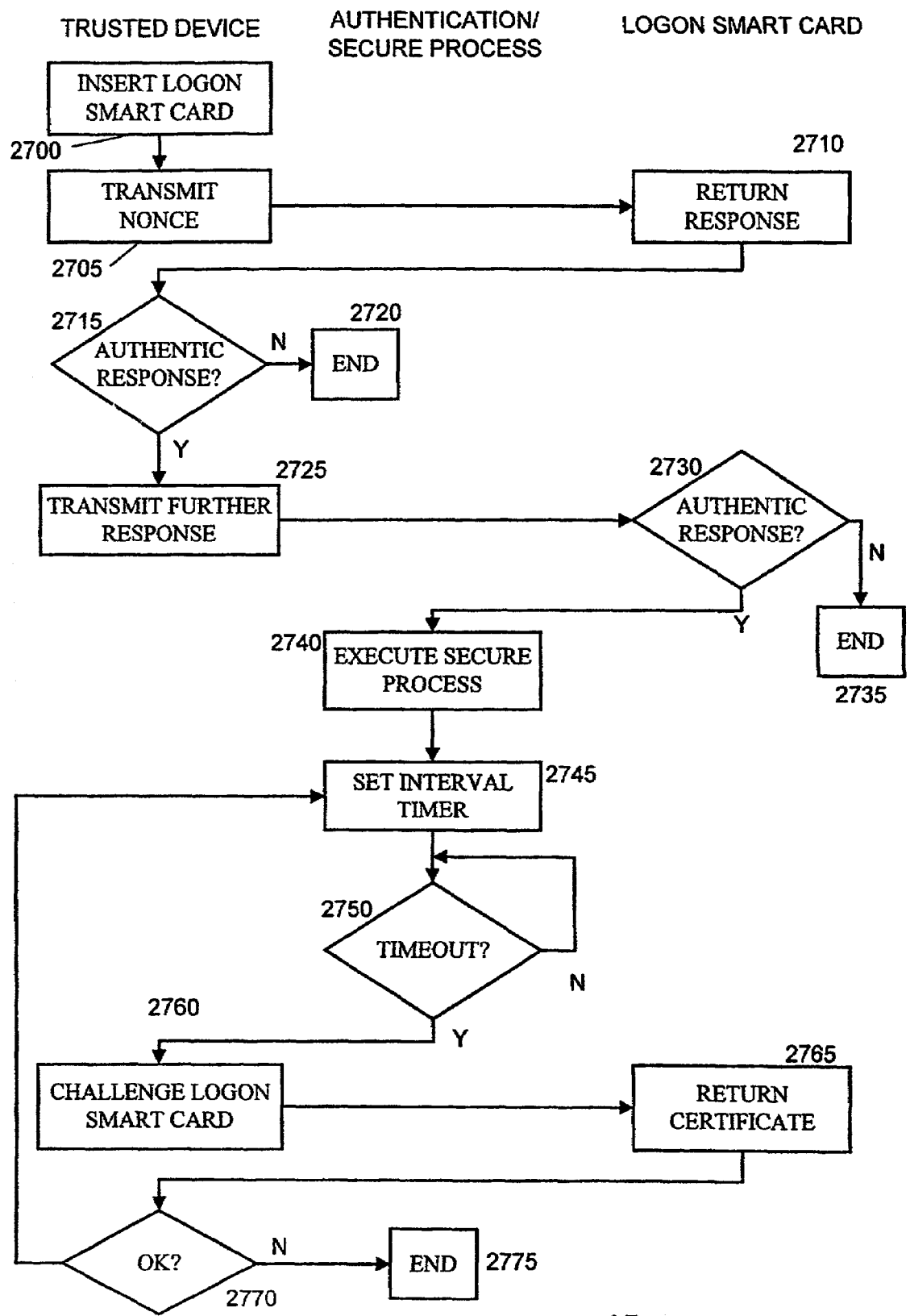
FIG. 15 is a flow diagram which illustrates the process of mutually authenticating a smart card and a host platform.

A preferred process for authentication between a user smart card 122 and a platform 100 will now be described with reference to the flow diagram in FIG. 15. As will be described, the process conveniently implements a challenge/response routine. There exist many available challenge/response mechanisms. The implementation of an authentication protocol used in the present embodiment is mutual (or 3-step) authentication, as described in ISO/IEC 9798-3. Of course, there is no reason why other authentication procedures cannot be used, for example 2-step or 4-step, as also described in ISO/IEC 9798-3.

Initially, the user inserts their user smart card 122 into the smart card reader 120 of the platform 100 in step 2700. Beforehand, the platform 100 will typically be operating under the control of its standard operating system and executing the authentication process, which waits for a user to insert their user smart card 122. Apart from the smart card reader 120 being active in this way, the platform 100 is typically rendered inaccessible to users by 'locking' the user interface (i.e. the screen, keyboard and mouse).

When the user smart card 122 is inserted into the smart card reader 120, the trusted device 260 is triggered to attempt mutual authentication in step by generating and transmitting a nonce A to the user smart card 122 in step 2705. A nonce, such as a random number, is used to protect the originator from deception caused by replay of old but genuine responses (called a 'replay attack') by untrustworthy third parties.

In response, in step 2710, the user smart card 122 generates and returns a response comprising the concatenation of: the plain text of the nonce A, a new nonce B generated by the user smart card 122, the ID of the trusted device 260 and some redundancy; the signature of the plain text, generated by signing the plain text with the private key of the user smart card 122; and a certificate containing the ID and the public key of the user smart card 122.

The trusted device 260 authenticates the response by using the public key in the certificate to verify the signature of the plain text in step 2715. If the response is not authentic, the process ends in step 2720. If the response is authentic, in step 2725 the trusted device 260 generates and sends a further response including the concatenation of: the plain text of the nonce A, the nonce B, the ID of the user smart card 122 and the acquired integrity metric; the signature of the plain text, generated by signing the plain text using the private key of the trusted device 260; and the certificate comprising the public key of the trusted device 260 and the authentic integrity metric, both signed by the private key of the TP.

The user smart card 122 authenticates this response by using the public key of the TP and comparing the acquired integrity metric with the authentic integrity metric, where a match indicates successful verification, in step 2730. If the further response is not authentic, the process ends in step 2735.

If the procedure is successful, both the trusted device 260 has authenticated the user smart card 122 and the user smart card 122 has verified the integrity of the trusted platform 100 and, in step 2740, the authentication process executes the secure process for the user. Then, the authentication process sets an interval timer in step 2745. Thereafter, using appropriate operating system interrupt routines, the authentication process services the interval timer periodically to detect when the timer meets or exceeds a pre-determined timeout period in step 2750.

Clearly, the authentication process and the interval timer run in parallel with the secure process.

When the timeout period is met or exceeded, the authentication process triggers the trusted device 260 to re-authenticate the user smart card 122, by transmitting a challenge for the user smart card 122 to identify itself in step 2760. The user smart card 122 returns a certificate including its ID and its public key in step 2765. In step 2770, if there is no response (for example, as a result of the user smart card 122 having been removed) or the certificate is no longer valid for some reason (for example, the user smart card has been replaced with a different smart card), the session is terminated by the trusted device 260 in step 2775. Otherwise, in step 2770, the process from step 2745 repeats by resetting the interval timer.

In this preferred implementation, the monitor 105 is driven directly by a monitor subsystem contained within the trusted component itself. In this embodiment, in the trusted component space are resident the trusted component itself, and displays generated by the trusted component on monitor 105. This arrangement is described further in the applicant's copending European Patent Application No. 99304164.9, entitled "System for Digitally Signing a Document" and filed on 28 May 1999 (and any patent applications claiming priority therefrom, including an International Patent Application of even date to the present application), which is incorporated by reference herein.

As will become apparent, use of this form of trusted device provides a secure user interface in particular by control of at least some of the display functionality of the host computer. More particularly, the trusted device (for these purposes termed a trusted display processor) or a device with similar properties is associated with video data at a stage in the video processing beyond the point where data can be manipulated by standard host computer software. This allows the trusted display processor to display data on a display surface without interference or subversion by the host computer software. Thus, the trusted display processor can be certain what image is currently being displayed to the user. This is used to unambiguously identify the image (pixmap) that a user is signing. A side-effect of this is that the trusted display processor may reliably display any of its data on the display surface, including, for example, the integrity metrics of the prior patent application, or user status messages or prompts.

The elements and functionality of a "trusted display" in which the trusted device is a trusted display processor will now be described further with reference to FIGS. 3 and 4.

It will be apparent from FIG. 3 that the frame buffer memory 315 is only accessible by the trusted display processor 260 itself, and not by the CPU 200. This is an important feature of the preferred embodiment, since it is imperative that the CPU 200, or, more importantly, subversive application programs or viruses, cannot modify the pixmap during a trusted operation. Of course, it would be feasible to provide the same level of security even if the CPU 200 could directly access the frame buffer memory 315, as long as the trusted display processor 260 were arranged to have ultimate control over when the CPU 200 could access the frame buffer memory 315. Obviously, this latter scheme would be more difficult to implement.

A typical process by which graphics primitives are generated by a host computer 100 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted display processor 260. These graphics primitives are finally passed by the CPU 200 to the trusted display processor 260. Example graphics primitives might be 'draw a line from point x to point y with thickness z' or 'fill an area bounded by points w, x, y and z with a colour a'.

The control program of the microcontroller 300 controls the microcontroller to provide the standard display functions to process the received graphics primitives, specifically:

receiving from the CPU 200 and processing graphics primitives to form pixmap data which is directly representative of an image to be displayed on the VDU 105 screen, where the pixmap data generally includes intensity values for each of the red, green and blue dots of each addressable pixel on the VDU 105 screen;

storing the pixmap data into the frame buffer memory 315; and periodically, for example sixty times a second, reading the pixmap data from the frame buffer memory 315, converting the data into analogue signals using the video DAC and transmitting the analogue signals to the VDU 105 to display the required image on the screen.

Apart from the standard display functions, the control program includes a function to mix display image data deceived from the CPU 200 with trusted image data to form a single pixmap. The control program also manages interaction with the cryptographic processor and the trusted switch 135.

The trusted display processor 260 forms a part of the overall 'display system' of the host computer 100; the other parts typically being display functions of the operating system, which can be 'called' by application programs and which access the standard display functions of the graphics processor, and the VDU 105. In other words, the 'display system' of a host computer 100 comprises every piece of hardware or functionality which is concerned with displaying an image.

As already mentioned, the trusted display of this embodiment relies on interaction between the trusted display processor and the user smartcard 122. Particularly significant is the 'seal' data SEAL in the non-volatile memory 420, which can be represented graphically by the trusted display processor 260 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 122 using well-known techniques. The processor 400 also has access to volatile memory 430, for example RAM, for storing state information (such as received keys) and providing a working area for the processor 400, and an interface 440, for example electrical contacts, for communicating with a smart card reader.

Seal images can consume relatively large amounts of memory if stored as pixmaps. This may be a distinct disadvantage in circumstances where the image needs to be stored on a smartcard 122, where memory capacity is relatively limited. The memory requirement may be reduced by a number of different techniques. For example, the seal image could comprise: a compressed image, which can be decompressed by the trusted display processor 260; a thumb-nail image that forms the primitive element of a repeating mosaic generated by the trusted display processor 260; a naturally compressed image, such as a set of alphanumeric characters, which can be displayed by the trusted display processor 260 as a single large image, or used as a thumb-nail image as above. In any of these alternatives, the seal data itself may be in encrypted form and require the trusted display processor 260 to decrypt the data before it can be displayed. Alternatively, the seal data may be an encrypted index, which identifies one of a number of possible images stored by the host computer 100 or a network server. In this case, the index would be fetched by the trusted display processor 260 across a secure channel and decrypted in order to retrieve and display the correct image. Further, the seal data could comprise instructions (for example PostScript™ instructions) that could be interpreted by an appropriately programmed trusted display processor 260 to generate an image.

Figure 16:
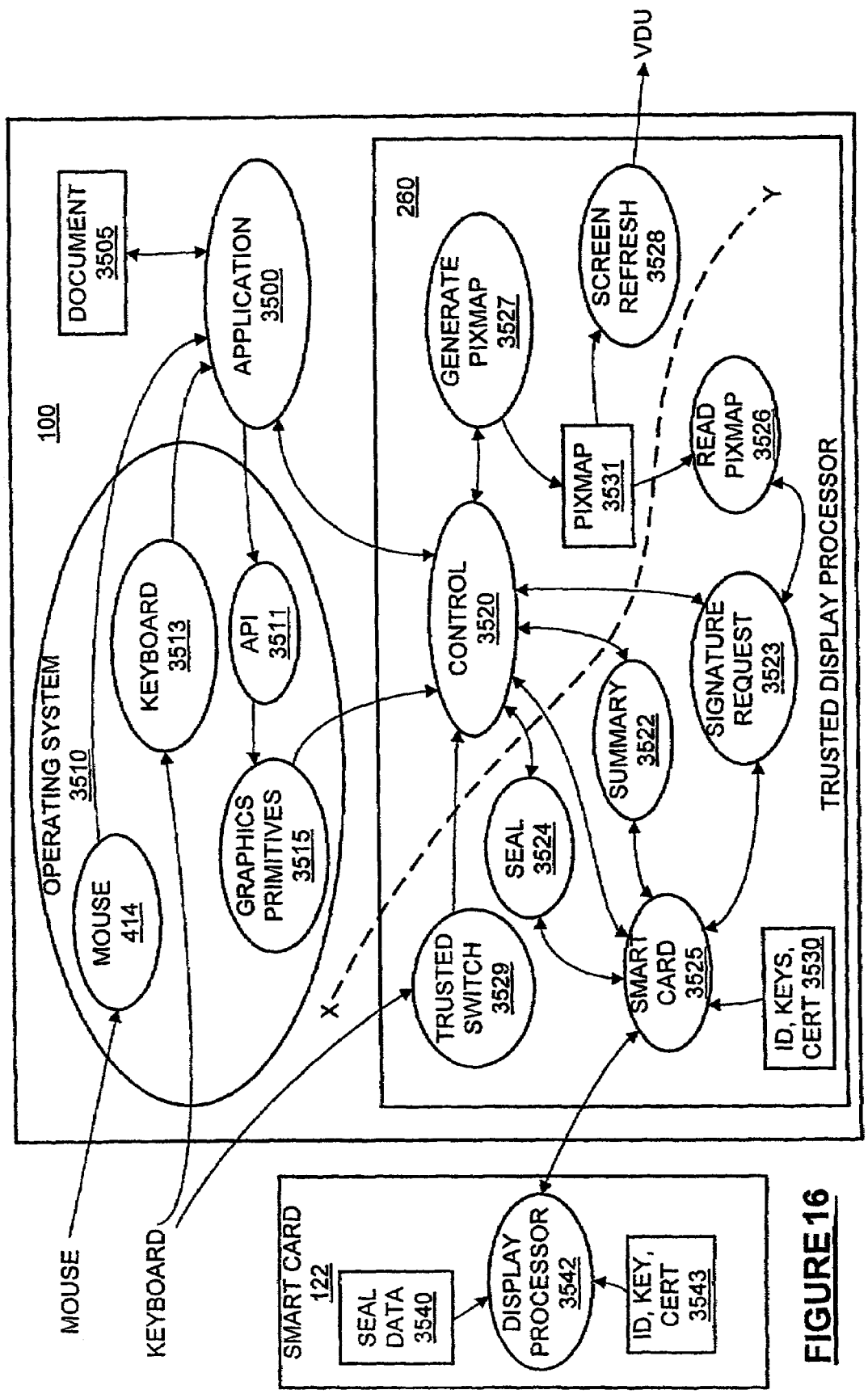
FIG. 16 is a diagram which illustrates a functional architecture of a computer platform including a trusted device adapted to act as a trusted display processor and a smart card suitable for operating in accordance with the preferred embodiment of the present invention.

FIG. 16 shows the logical relationship between the functions of the host computer 100, the trusted display processor 260 and the smartcard 122, in the context of enacting a trusted signing operation. Apart from logical separation into host computer 100, trusted display processor 260 or smartcard 122 functions, the functions are represented independently of the physical architecture, in order to provide a clear representation of the processes which take part in a trusted signing operation. In addition, the 'standard display functions' are partitioned from the trusted functions by a line x-y, where functions to the left of the line are specifically trusted functions. In the diagram, functions are represented in ovals, and the 'permanent' data (including the document image for the duration of the signing process), on which the functions act, are shown in boxes. Dynamic data, such as state data or received cryptographic keys are not illustrated, purely for reasons of clarity. Arrows between ovals and between ovals and boxes represent respective logical communications paths.

In accordance with FIG. 16, the host computer 100 includes: an application process 3500, for example a word-processor process, which requests the signing of a document; document data 3505; an operating system process 3510; an API 3511 process for receiving display calls from the application process 3500; a keyboard process 3513 for providing input from the keyboard 110 to the application process 3500; a mouse process 3514 for providing input from the mouse 115 to the application process 3500; and a graphics primitives process 3515 for generating graphics primitives on the basis of calls received from the application process via the API 3511 process. The API process 3511, the keyboard process 3513, the mouse process 3514 and the graphics primitives process 3515 are build on top of the operating system process 3510 and communicate with the application process via the operating system process 3510.

The remaining functions of the host computer 100 are those provided by the trusted display processor 260. These functions are: a control process 3520 for coordinating all the operations of the trusted display processor 260, and for receiving graphics primitives from the graphics primitives process and signature requests from the application process 3500; a summary process 3522 for generating a signed summary representative of a document signing procedure in response to a request from the control process 3520; a signature request process 3523 for acquiring a digital signature of the pixmap from the smartcard 122; a seal process 3524 for retrieving seal data 3540 from the smartcard 122; a smartcard process 525 for interacting with the smartcard 122 in order to enact challenge/response and data signing tasks required by the summary process 3522, the signature request process 3523 and the seal process 3524; a read pixmap process 3526 for reading stored pixmap data 3531 and passing it to the signature request process 3523 when requested to do so by the signature request process 3523; a generate pixmap process 3527 for generating the pixmap data 3531 on the basis of graphics primitives and seal image data received from the control process 3520; a screen refresh process 3528 for reading the pixmap data, converting it into analogue signals and transmitting the signals to the VDU 105; and a trusted switch process 3529 for monitoring whether the trusted switch 135 has been activated by the user. The smartcard process 3525 has access to the trusted display processor's identity data $I_{DP}$, private key $S_{DP}$ data and certificate $Cert_{DP}$ data 3530. In practice, the smart card and the trusted display processor interact with one another via standard operating system calls.

The smartcard 122 has: seal data 3540; a display processor process 3542 for interacting with the trusted display processor 260 to enact challenge/response and data signing tasks; smartcard identity data $I_{SC}$, smartcard private key data $S_{SC}$ and smartcard certificate data $Cert_{SC}$ 3543.

In other embodiments of the invention, the functionality of trusted switch 135 may be replaced by software. When the trusted switch process 529 is activated (as in step 630), instead of waiting for operation of a dedicated switch, the trusted component 260 uses its random number generation capability to generate a nonce in the form of a textual string. This textual string is then displayed on the trusted display in a message of the form "Please enter <textual string> to confirm the action>. To confirm the action, the user must then enter the given textual string, using the keyboard 110. As the textual string will be different every time, and because no other software has access to this textual string (it passes only between the trusted processor 300 and the display), it will not be possible for malicious software to subvert this confirmation process.

On each individual smart card may be stored a corresponding respective image data which is different for each smart card. For user interactions with the trusted component, e.g. for a dialogue box monitor display generated by the trusted component, the trusted component takes the image data from the user's smart card, and uses this as a background to the dialogue box displayed on the monitor 105. Thus, the user has confidence that the dialogue box displayed on the monitor 105 is generated by the trusted component. The image data is preferably easily recognizable by a human being in a manner such that any forgeries would be immediately apparent visually to a user. For example, the image data may comprise a photograph 802 of a user. The image data on the smart card may be unique to a person using the smart card.

In preferred embodiments of the present invention, the trusted component operates to monitor data, including user data files and applications, on the computer platform by creating a set of data files which the trusted component dynamically monitors for any changes in the data, including absence of the data, which may occur as a result of the computer platform being compromised by a virus attack, or other interference. The trusted component is allocated or seizes a plurality of memory location addresses and/or file directories in the first memory area of the computer platform, which become a user space reserved for use by the trusted component. The reserved memory area comprises a selected proportion of the total memory area of the computer platform. Within the reserved memory area, the trusted component preferably creates a plurality of directories. Within the reserved memory area, the trusted component also creates a plurality of data files, which can either be copies from real user files on the computer platform, or which can be created by the trusted component. The primary purpose of these files is to act as a set of files to which the trusted component has access, and to which ordinary user accounts of the computer platform, under normal operation, do not have access. Because the files in the reserved memory area are reserved for use by the trusted component and under normal operation, are not accessed by applications on the computer platform, the trusted component can use files stored in the reserve memory area as a "control" set of files by which to monitor for unauthorized changes to the data, for example as caused by a virus. It will be appreciated that the 'NT administrator' or the 'Unix super user' or similar accounts with overriding powers must refrain from making changes to the data in the reserved space, even though it can.

Because the files stored in the reserve memory area are either duplicates of user files, duplicates of applications or files created specifically by the trusted component, they are of little or no value to the computer platform for performing its normal operating functions. If the files in the reserve memory area become corrupted for any reason, they may be sacrificed and are easily replaceable. However, since access to the reserved access memory area is restricted to the trusted component, any corruption of the files in the reserve memory area is deemed to be indicative of changes to files occurring through undesirable mechanisms, e.g. by a virus program. The files in the reserve memory area are periodically monitored by the trusted component to check for such corruption. If corruption is discovered, by the monitoring process, then a measure of the likely corruption of the remaining memory area on the computer platform can be determined by probabilistic methods.

By providing a reserved memory area containing files which can be sacrificed, if the computer platform is compromised by a hostile attack, e.g. a virus, then the sacrificial files stored in the reserved memory area are at least as likely to be affected as other user data files stored in the remaining portion of the memory of the computer platform. Thus any corruption of the files in the reserve memory area, if spotted early enough, may give an indication to the trusted component that file corruption is occurring on the computer platform, in which case the trusted component can take action to limit the spread of corruption at an early stage, and preferably before damage is done to important data files stored in the remaining memory area of the computer platform.

Figure 5:
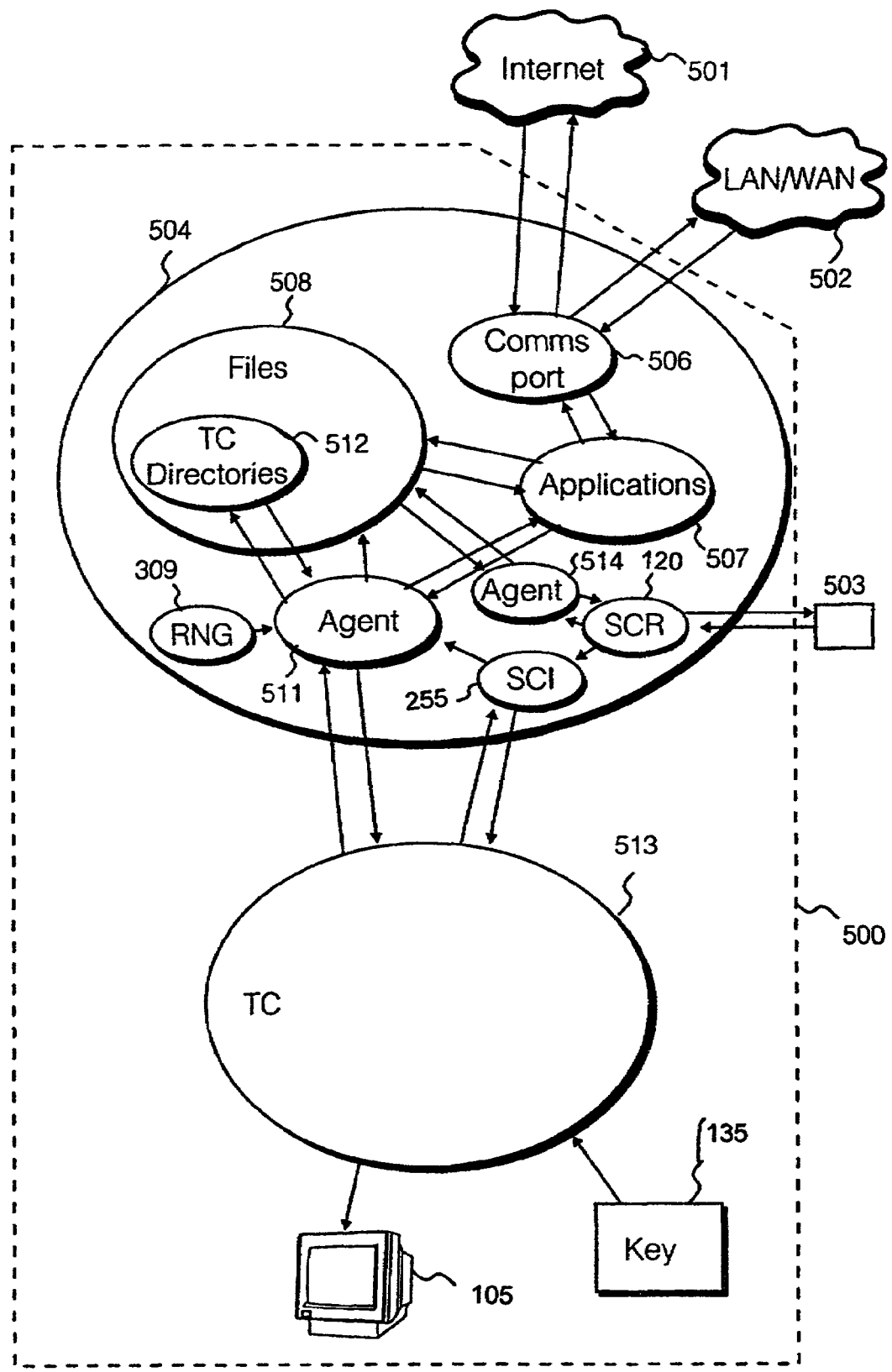
FIG. 5 illustrates schematically a logical architecture of the computer entity of FIG. 1, comprising a trusted space, and a user space.

Referring to FIG. 5 herein, there is illustrated schematically a logical architecture of the trusted computer entity referred to in FIGS. 1 to 4 herein. The logical architecture has a same basic division between the computer platform, and the trusted component, as is present with the physical architecture described in FIGS. 1 to 3 herein. That is to say, the trusted component is logically distinct from the computer platform to which it is physically related. In FIG. 5, components of the computer entity are illustrated within the dotted line 500, whereas elements external to the computer entity, such as the Internet 501, and one or more local area networks or wide area networks 502, and a user's smart card 503 are shown outside dotted line 500. Logically, the computer entity is divided into "user space" 504, comprising all logical areas accessible by computer platform, and "trusted component space" 513 comprising areas accessible solely by the trusted component 260. The user space 504 includes one or more communications port facilities 506; one or more applications programs 507, for example a word processor, database package, accounts package, Internet access application, etc; a set of file directories 508; smart card interface 255, for interfacing with the smart card reader 120, optionally a random number generator 309, and optionally, a software agent 511 which is used by the trusted component to manipulate files and applications in user space, and to report back to the trusted component. Optionally a software agent 514 is used by the smartcard 503 to manipulate files and applications in user space, and to report back to the smartcard.

In the trusted component space, are resident the trusted component itself, displays generated by the trusted component on monitor 105; and confirmation key 135, inputting a confirmation signal via a confirmation key interface.

Within the file directory area 508 is a set of reserved directories 512 for creation of a set of data files reserved for use by the trusted component, and used for monitoring in the user space according to the specific methods described herein. For ease of reference, such files will hereafter be referred as 'reserved files'.

The random data generator 309 is used to generate random data, forming the content of various of the reserved files in the reserved one or more directories.

Figure 6:
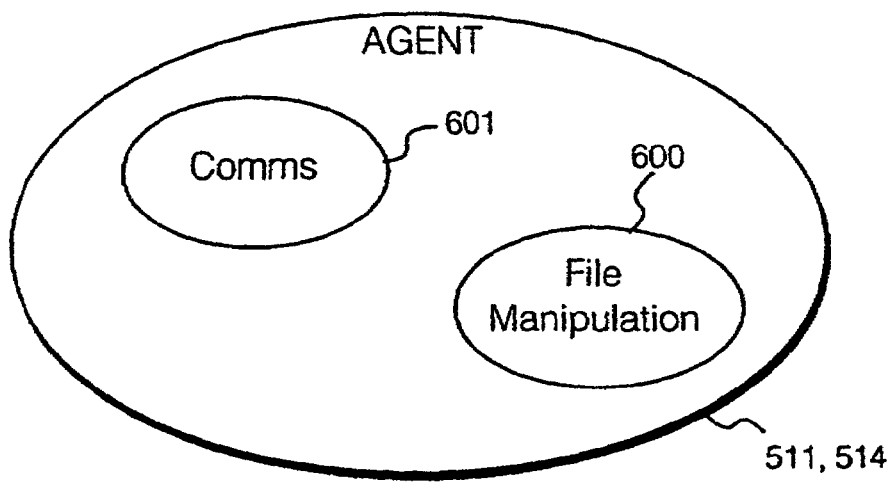
FIG. 6 illustrates schematically a logical content of a software agent component of the computer entity of FIG. 1.

Referring to FIG. 6 herein, the software agents 511 and 514 each comprise a corresponding respective one or more file manipulation programs 600; and a corresponding respective communications interface 601. The file manipulation program(s) within the software agent 514 in user space operate on instruction from smartcard 503 to: monitor a plurality of said data files in the one or plurality of directories in user space reserved for use by the user of the smartcard: copy said files to user space reserved for use by the user of the smartcard but which also allows read access by the trusted component: and delete said copied files. The file manipulation program(s) within the software agent 511 in user space operate on instruction from trusted component 260 to: create and monitor a plurality of data files in the one or plurality of directories in user space reserved for use by the trusted component: copy files from user space reserved for use by the user of the smartcard but which also allows read access by the trusted component.

Figure 7:
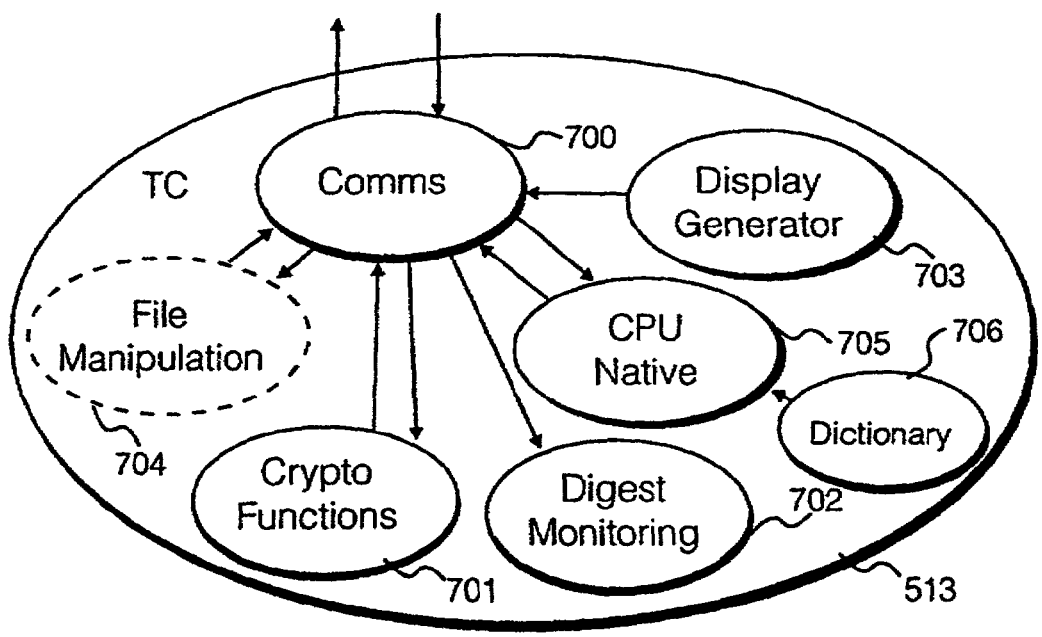
FIG. 7 illustrates schematically a set of logical components comprising a trusted component of the computer entity of FIG. 1.

Referring to FIG. 7 herein, there is illustrated schematically logical components of trusted component 260. Trusted component 260 comprises a communications interface 700; a set of cryptographic functions 701 including a random number generator and cryptographic algorithms for communicating with smart card reader 120; one or more monitoring applications 702 for monitoring data relating to reserved files; a display interface program 703 for generating an interactive display on monitor 105 and allowing interface via the display using pointing device 115 and keypad 110; optionally one or more file manipulation programs 704; native code 705 for monitoring files by gathering and reporting information describing the data content of the files to the trusted component as in software agent 511; and a dictionary program 706 for generating text and strings of text for using as data to name directories and files and fill reserved files in user space 504. The trusted component also contains a dictionary of file names, which is used automatically to name and rename the reserved file directories and reserved files.

There will now be described specific methods of operation of the computer entity for security monitoring of data files in the computer platform, by the trusted component 260. In the following description, there are illustrated in FIGS. 8-12 herein main process steps operated by the trusted component and computer platform for performing the method. It will be understood by those skilled in the art that such process steps may be implemented in the form of code in a conventional programming language stored in the memory of the trusted component and the computer platform. Steps relating to operations carried out in user space, in general are executed on the processor 200 according to code stored in either the memory of the trusted component or the computer platform, but some part(s) of those operations may be carried out inside the trusted component 260 according to code stored in a memory device of the trusted component. On the other hand, where process steps are shown as operating in trusted component space, the steps are executed within the trusted component 260 (for example on the processor 400) according to code stored in a memory device of the trusted component. Implementation of such code is well known by those skilled in the art, and such code may be written in conventional computer program languages such as C, C++, or the like.

Figure 8:
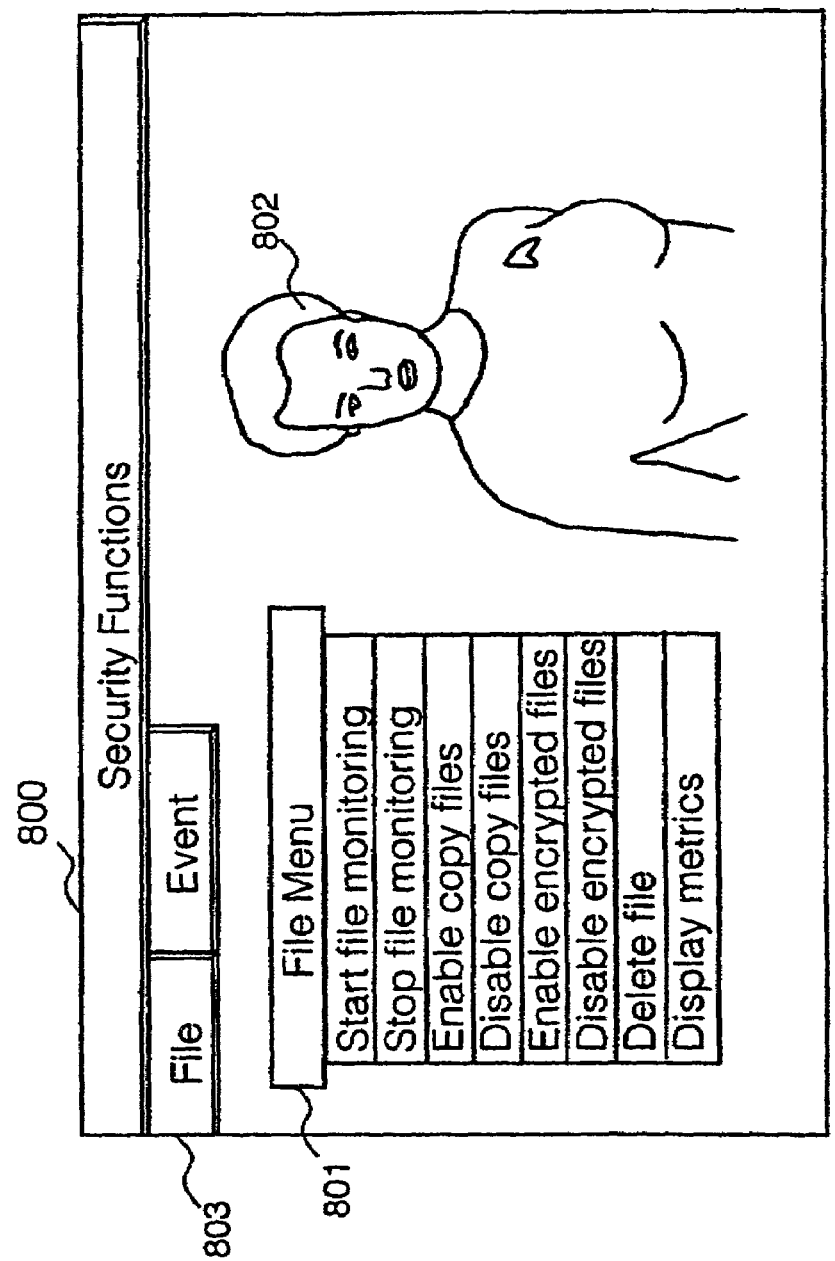
FIG. 8 illustrates schematically a dialog box display generated by the trusted component.
Figure 9:
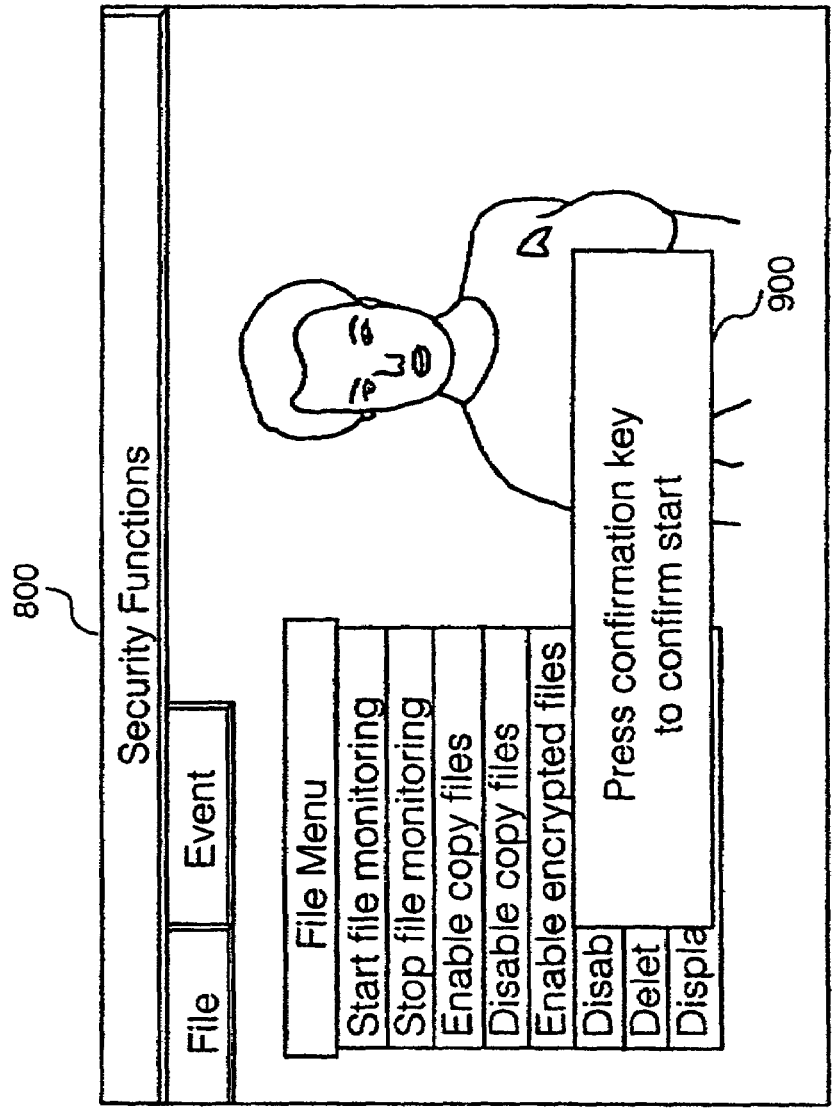
FIG. 9 illustrates a further dialog display generated by the trusted component.

Referring to FIGS. 8 and 9 herein, there will now be described a first mode of operation for a security monitoring process, which is activated by user. The computer platform generates a conventional operating system display having a plurality of icons, for example a display as produced by the Windows 95™ operating system. An icon is provided on the operating system display, created in known manner, which when activated by a user using the pointing device, e.g. mouse 115 results in a dialog box display generated by trusted component 260, for example as shown in FIG. 8 herein. The dialog box 800 is generated by display interface 703 of trusted component 260. The dialog box 80 comprises one or more menu displays 801, displayed upon a display background comprising an image 802 retrieved from a user smart card 503 which must be inserted into smart card reader device 120 in order to provide the image on the dialog box display background. Since the image displayed on the dialog box background is that stored on the user smart card, the user can be confident that the dialog box is created by the trusted component, since the obtaining of the image data from the smart card is carried out by obtained encrypted image data from the smart card using crypto functions 404, 701 stored in the trusted component. On viewing the dialog box 800, the user may activate pointing device 115 to click on an icon display 803 to produce a drop-down menu 801 with options for file manipulation. For example, menu options may include icons to: start file monitoring; stop file monitoring; enable the copying of files; disable the copying of files; enable the creation of encrypted files; disable the creation of encrypted files; delete files in the reserved memory area of the computer platform or to display metrics of files. On the user selecting one of the options, the trusted component generates a confirmation display 900 prompting the user to activate the confirmation key 135. Because the confirmation key 135 is wired directly to the trusted component 260, activation of the confirmation key provides a secure method by which the trusted component is activated directly by the user without any third party intervention, and ensures that the options selected through the menu display from the pointing device input 105 are independently confirmed by separate key activation through a separate channel avoiding data bus 304, and avoiding the computer platform, and directly to the trusted component 260.

Figure 10:
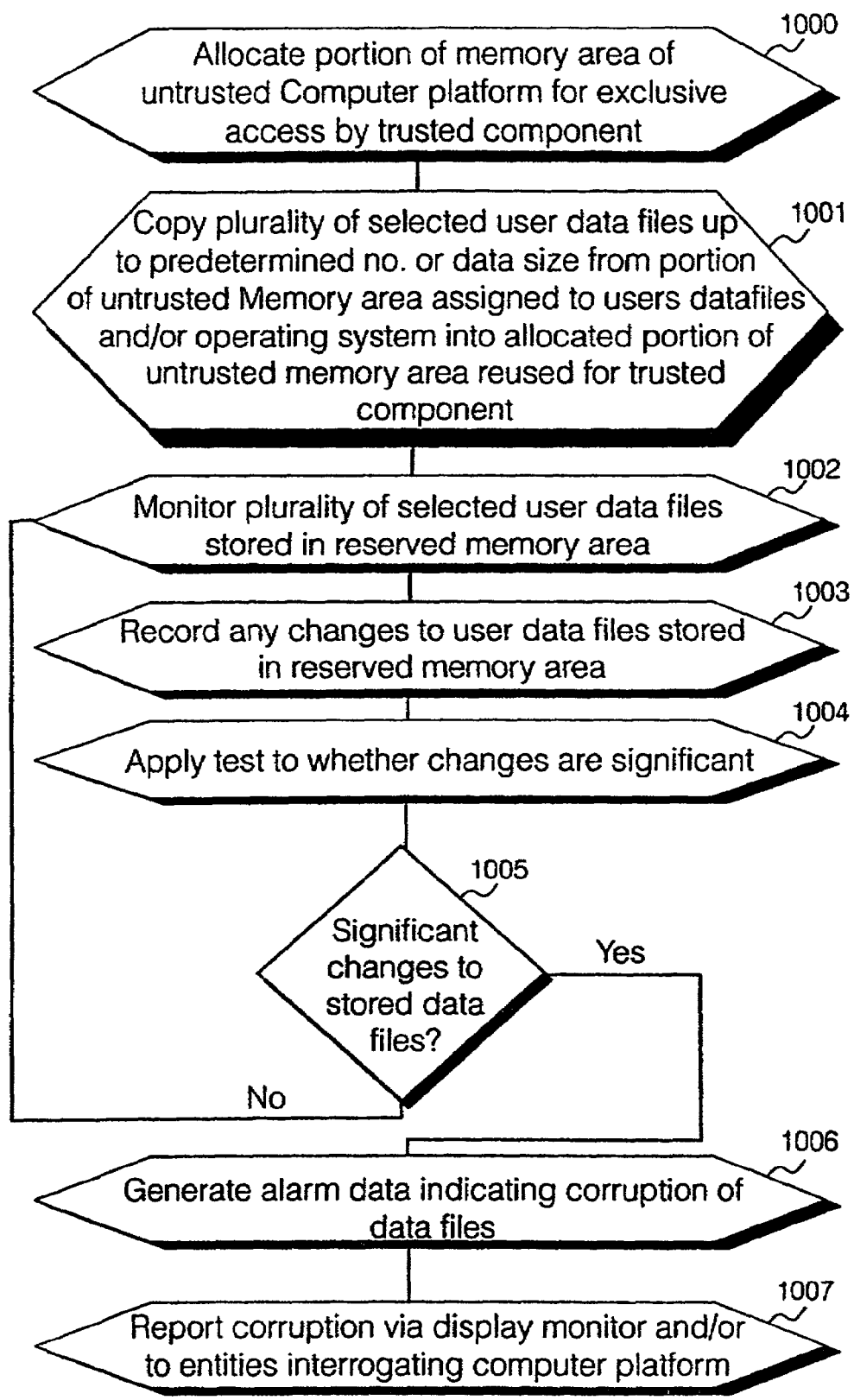
FIG. 10 illustrates schematically a first set of process steps carried out by the trusted component and a software agent of the trusted component for performing a security monitoring method according to the present invention.

Referring to FIG. 10 herein, there is illustrated schematically process steps operated by the combination of the software agent 511 and trusted component 260 for monitoring of data files file directories 508.

In step 1000, the trusted component 260 seizes a portion of the memory capacity of the computer platform, for example hard disc or RAM for exclusive access by the trusted component, via the software agent 511. The software agent 511 may seize the memory area by creating one or a plurality of directories, for its own use, either directly, bypassing the operating system functions for file creation, or alternatively by making appropriate instructions to the operating system to create the appropriate directory or directories. Agent 511 creates a plurality of data files in those reserved directories in step 1001. Creation of data files can be by three methods. Firstly, file creation may occur by the copying into the reserved directories of existing files on the computer platform belonging to the user, with the user's permission. Secondly, agent 511 may allocate file names within those reserved directories. The file names and names of reserved dictionaries being provided by dictionary program 706. The data within the files is provided by dictionary program 706 within the trusted component 260 which generates individual words and strings of words of text which are passed to agent 511, which then writes those words or strings of words into the created reserved files in the reserved directories. Thirdly, the agent 511 may create its own data files of substantially random data, by storing random bits generated by random number generator 309 (or by the random number generator inside the trusted component's cryptographic functions) in the created files. In step 1002, agent 511 monitors the plurality of created reserved data files stored in the reserved memory area 512. A data digest of each memory file created by agent 511 is produced by applying a hash function algorithm to the data. The hash function may be applied by the agent 511 and the digest data for each agent created file reported back periodically to trusted component 260, which stores the digest data in its trusted memory area 335. Alternatively, the agent 511 may periodically report each agent created file to the trusted component 260, which generates its own digest using its crypto functions and stores the digest data in its trusted memory area 335. Trusted component 260 stores at least two digest data, comprising a previous digest data and a most recently received current digest data for each monitored reserved data file in its memory area 335. Trusted component 260 operates an algorithm comprising digest monitoring component 702, to check whether the previous digest data of each particular agent created data file is identical to the current digest data of that file. Within digest monitoring component 702, there is provided a separate file space into which results of the monitoring process are recorded. Any changes to the reserved data files in the reserved memory area in user space 508 discovered by monitoring the digest data within the trusted component are recorded to the error record file within the trusted component in step 1003. From time to time changes in data files stored in the reserved memory area may occur due to normal system malfunctions, which are not due to hostile attack by external stimuli, e.g. viruses. However, such changes to the data files may be very rare. An algorithm within the monitoring component of 702 of the trusted component applies a statistical test as to whether any changes to data files which have been recorded in the error file are statistically relevant. For example, the algorithm within the trusted component may be preset to allow a predetermined number of errors to occur within any given period. For example, an error level of one error per month on a predetermined number of reserved files may be preset as an allowable rate of errors. If more errors occur than this in the predetermined time, giving rise to a significant level of errors in the monitored files in the reserved memory area, in step 1004, the test applied by the trusted component to see whether such tests are significant may prove positive. If no significant changes in the stored data files are determined in step 1005, the trusted component and agent 511 continues to periodically monitor the selected data files in the reserved area of user memory on the computer platform in step 1002. If the number of errors are significant, in step 1006 the trusted component may generate an alarm data indicating a significant level of data corruption in the monitored files, and in step 1007 may report such corruption by generating a display on monitor 105. Further, on experiencing a significant level of errors in the monitored data files, resulting in an alarm condition, the trusted component may notify any other third party entities communicating with the computer platform, that the computer platform is in an alarm condition and possibly that data on the platform or the functionality of the platform has been compromised.

Applying a hash program to data in the user space 504 using the main processor 201 and sending the digest to the trusted component 260 is fast, because of the superior processing capabilities of user space 504, but has the disadvantage that the hash program may have been subverted (by a virus, for example), so there is a reduced level of confidence in the digest given to the trusted component. Sending the entire original file data to the trusted component, and causing the trusted component to compute a digest using its own resources, for example on processor 300 and with its crypto functions, has the disadvantage that the process is slower, because the trusted component has inferior computing capability than the user space 504. It has the advantage that the hash program cannot be subverted, hence there is greater confidence in the value of the digest.

Where file manipulation is carried out by agent 511, its file manipulation program 600 runs continuously, monitoring files in the reserved directories, and reporting back to trusted component 260.

Because the files in the reserved directories in the user space which are created by agent 511, look to a computer virus as being exactly the same as real data files, or in the case of random data, look the same as encrypted data files, a hostile virus having entered into the computer platform is equally likely to affect the sacrificial files stored in the reserved directories as it is to attack user data files in the user space. The proportion of data files, in terms of file numbers, or in terms of megabytes of data stored in the files, can be selected by a user, by means of a drop-down menu in a dialog box, or can be preset in the trusted component, or agent software. For example, if the number of sacrificial files is set at being 10% of the number of real user files created, then for viruses which identify files by file name, there is a corresponding percentage (for example 10%) probability that a virus will attack the sacrificial files in reserved directories, of all the files including sacrificial files and user files stored on the computer platform. Thus, the extent, number and frequency of errors occurring in the sacrificial file directories may give a statistical measure of the extent of damage done by a computer virus. Because monitoring of the sacrificial files is continuous, whilst the computer entity is operating, the best mode herein may provide real time monitoring for attack by external programs, which provides an alarm function to operate when a predetermined level of file corruption has occurred on the computer platform, in a manner which cannot be interfered with by users of the computer platform, thereby lending increased trustability to the computer entity.

Figure 11:
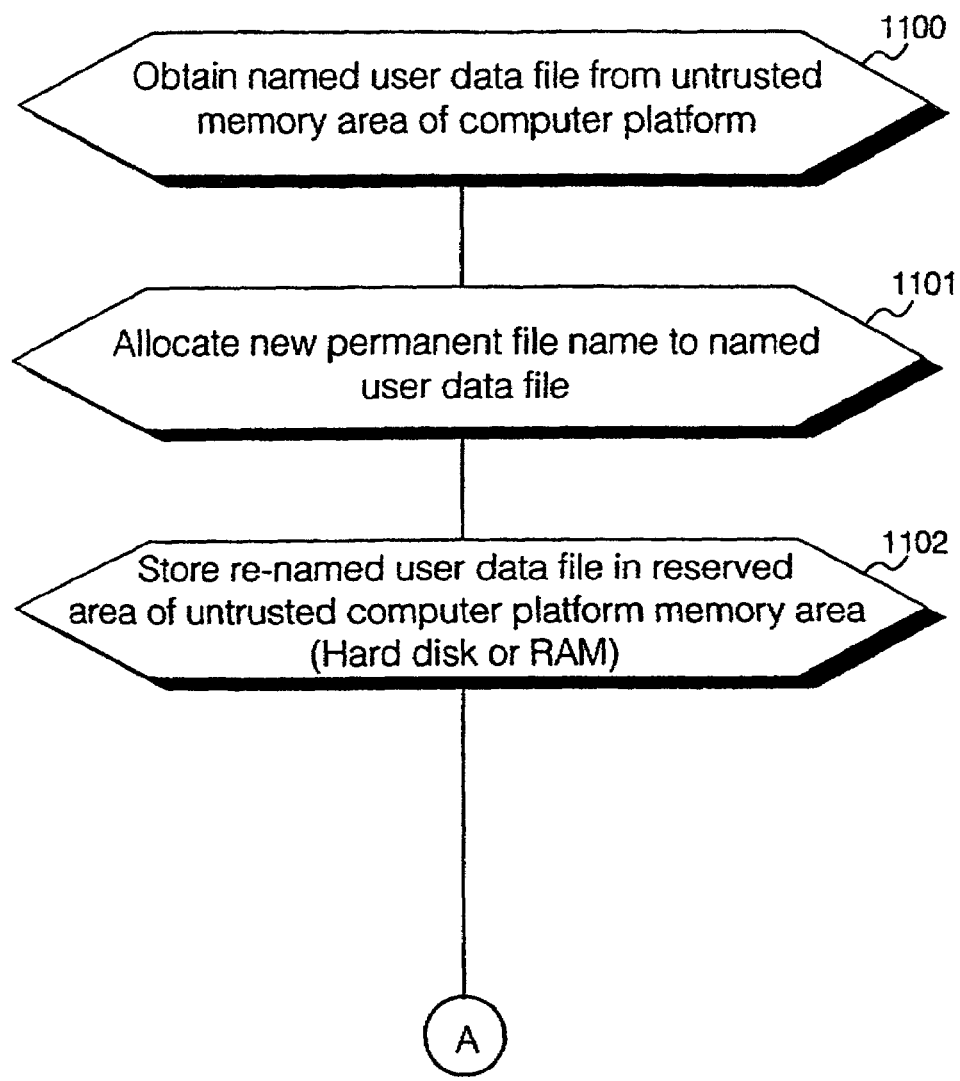
FIG. 11 illustrates schematically a second set of process steps carried out by the trusted component and software agent for carrying out a security monitoring method according to the present invention.
Figure 11B:
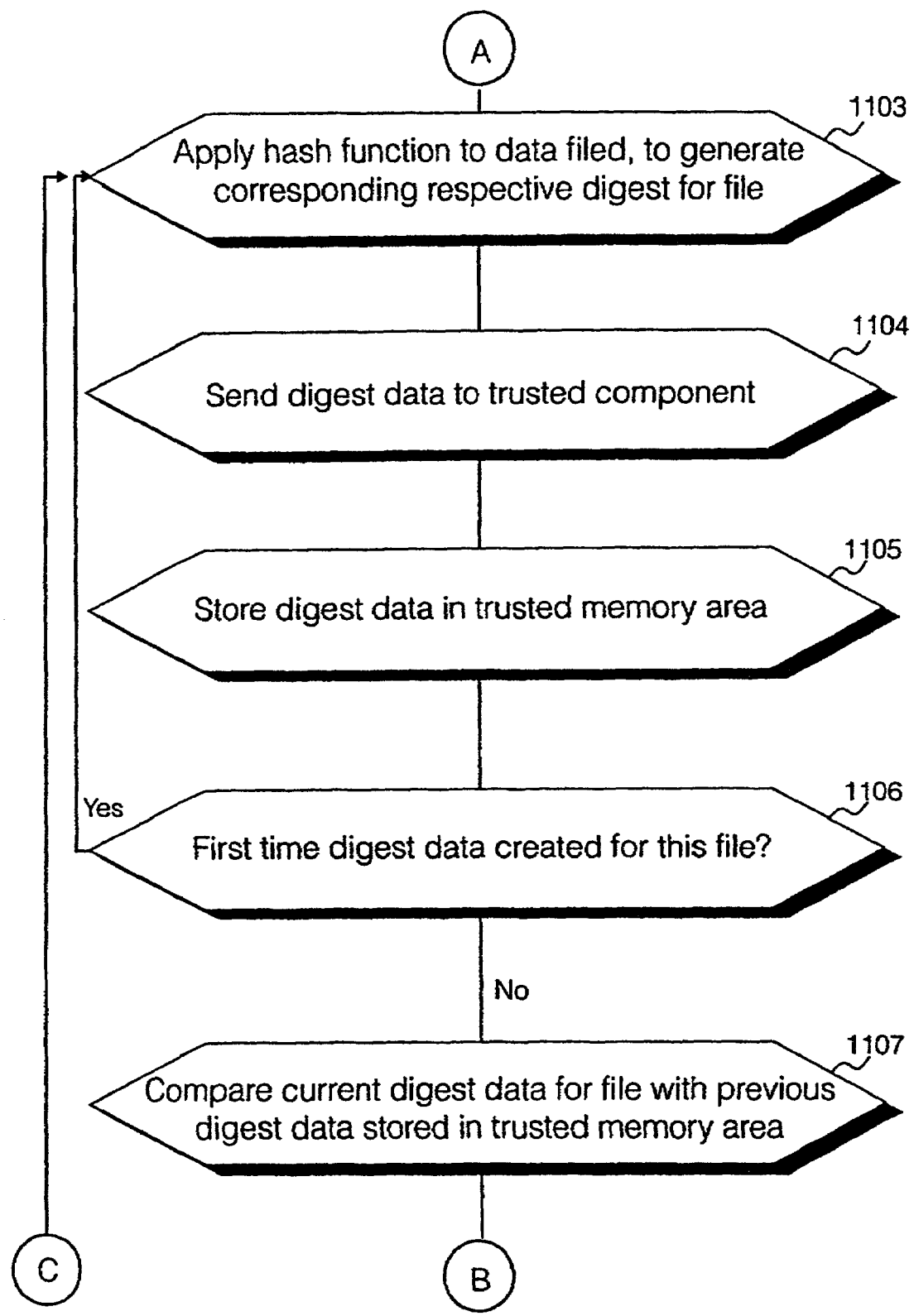
Figure 11C:
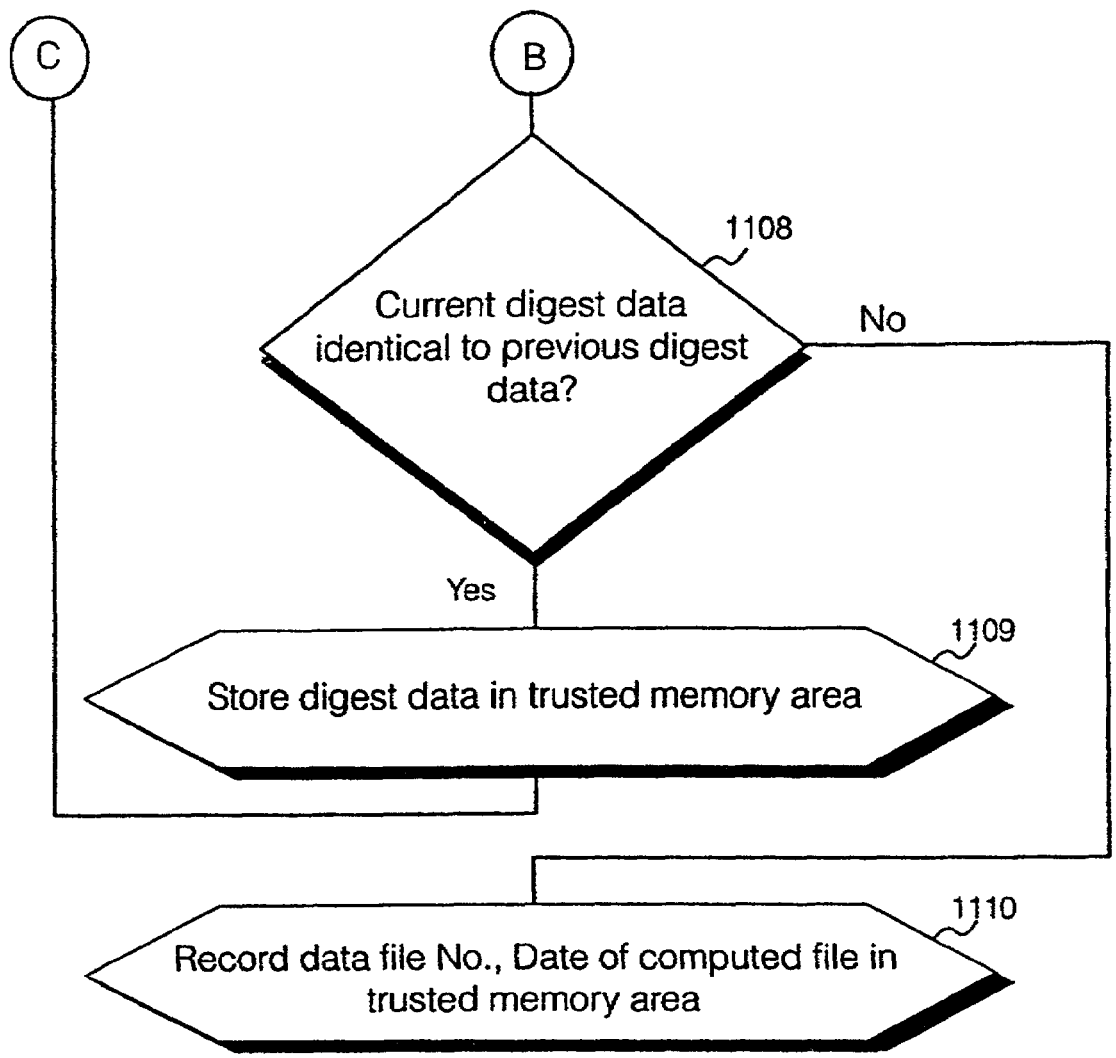

Referring to FIG. 11 herein, there is illustrated schematically in more detail process steps carried out by agent 511 in creating data files in the reserved directories by copying user files, and reporting to trusted component 260. In step 1100, agent 511 obtains a named user data file from the untrusted memory area of the computer platform, with the user's permission. The user gave that permission by selecting the 'enable copy files' option on the file menu 801 in the security function dialog box 800. The user may indicate his or her permission for copying the file, by pressing confirmation key 135 upon display of the pressed confirmation key display prompt 900 as described previously. In step 1101, agent 511 selects a new file name for the file copied over from the user files. The new file name may be selected randomly by agent 511, or may be generated according to predetermined rules stored in agent 511. A different file name is created, for the copied user file in the reserved directory in which it is stored, which is specific to the agent 511 and accessible only by agent 511. In step 1102, the agent stores the renamed user data file in the reserved directory in the reserved memory area of the (untrusted) computer platform memory area, e.g. the hard disc or RAM. In step 1103, agent 511 applies a hash function to the data file to generate a corresponding respective digest data for the file. The digest data is reported back to trusted component 260 in step 1104. The trusted component stores the digest data in a trusted memory area 335 as described previously in step 1105. In step 1106, the trusted component determines whether it is the first time that a digest data has been created for that file. That is to say, the trusted component determines whether an historical data for that particular file already exists in the trusted component's memory area 335, or whether the currently obtained digest data from agent 511 is the first data obtained for that file. If the digest data obtained for that file is the first digest data obtained for that file, then the trusted component stores the digest data in its trusted memory area as current digest data, and waits for agent 511 to report a further digest data on the same file after a predetermined monitoring period i.e. waits until agent 511 applies a hash function as per step 1103 described previously and reports a new current digest data. On receiving the new current digest data (the second digest data for that file) the trusted component then has a current and an historical digest data for that file, and can make a comparison between the current and historical stored digest data in trusted memory area 335 for a particular file in step 1107. If the result of the comparison is that the current digest data for a particular file is the same as previous historical digest data for the file in step 1108, then after waiting a predetermined period in step 1109 during which agent 511 periodically monitors the user data file, agent 511 applies the hash function in step 1303 and reports the digest data to trusted component 260 in steps 1103-1104. However, if it is determined that there is a change in the current digest data for a particular file compared to the previously reported historical digest data in step 1108, then the trusted component records the details of the file number and time of the change in data in the error file in the trusted memory area 335 for that file in step 1110.

Hash functions are well-known in the prior art and comprise one way functions which are capable of generating a relatively small output data from a relatively large quantity of input data, where a small change in the input data results in a significant change in the output data. Thus, a data file to which is applied a hash function results in a first digest data (the output of the hash function). A small change e.g. a single bit of data in the original data file will result in a significantly different output when the hash function is reapplied to the modified data file. Thus, a data file comprising megabytes of data may be input into the hash function and result in a digital output of the order of 128 to 160 bits length, as the resultant digest data. Having a relatively small amount of digest data generated from a data file stored in the reserved directory is an advantage, since it takes up less memory space and less processing power in the trusted component.

Figure 12:
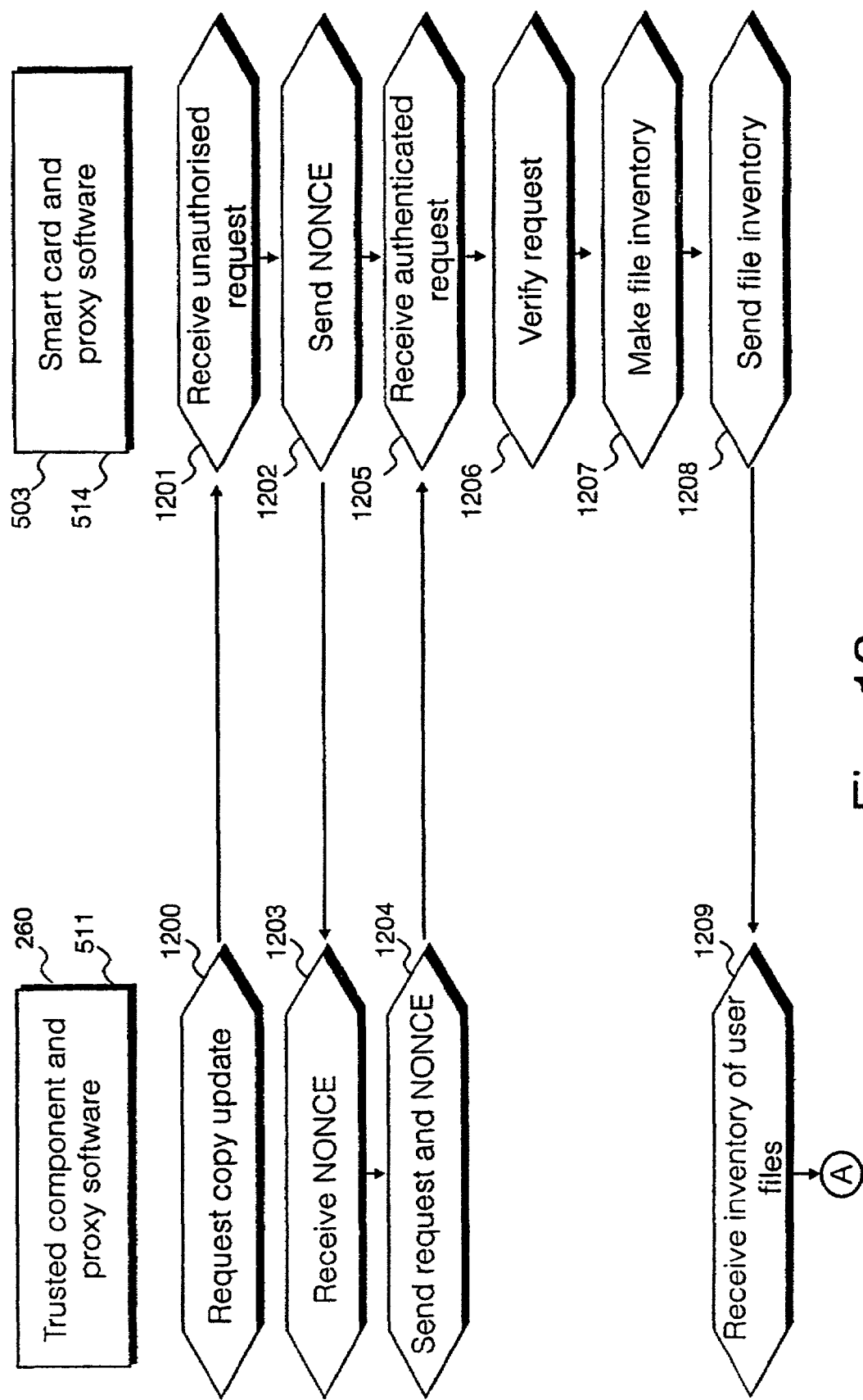
FIG. 12 illustrates schematically a third set of process steps and interaction between the trusted component, its software agent, a user smart card, and its software agent for carrying out a specific method according to the present invention.
Figure 12B:
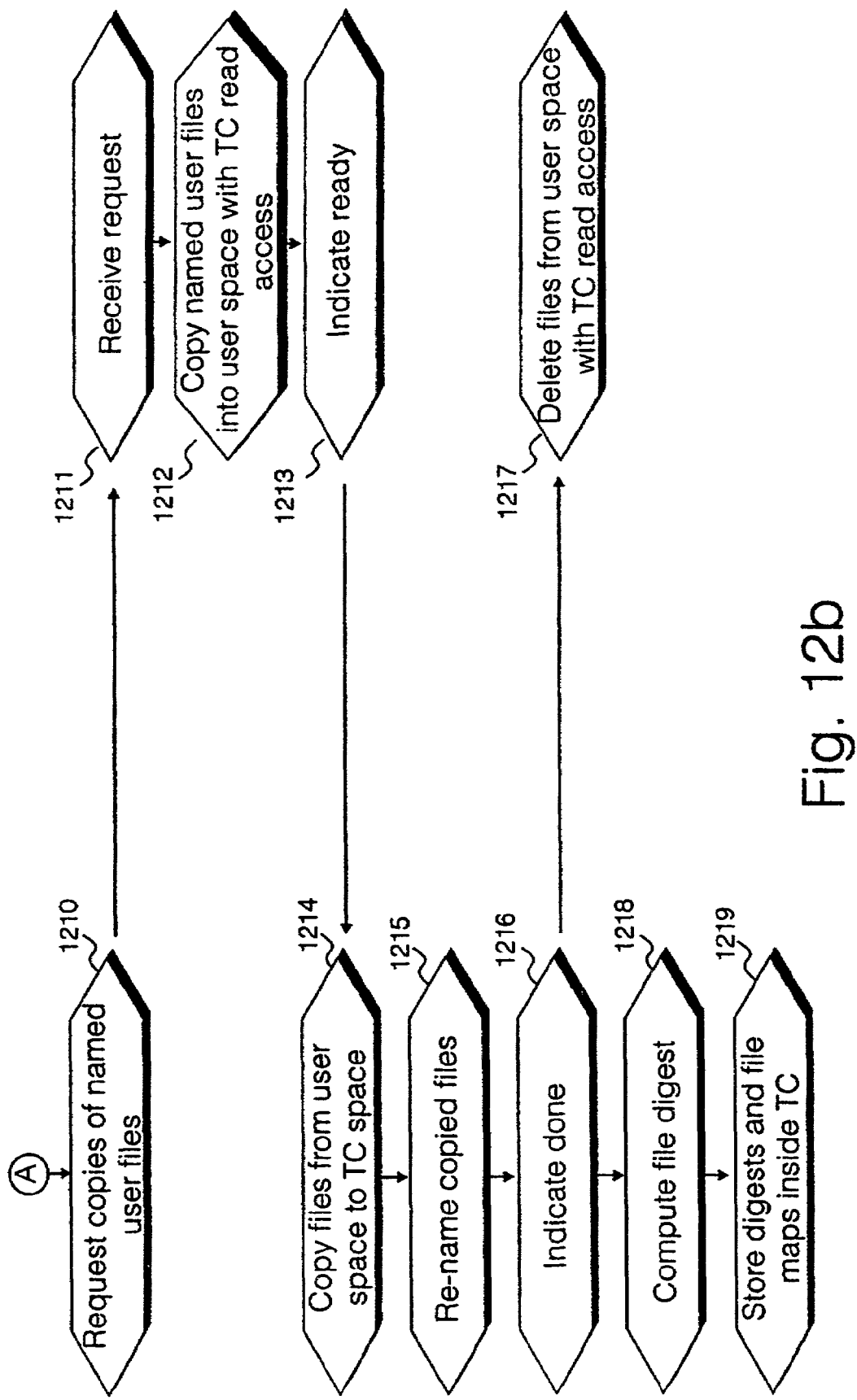

Referring to FIG. 12 herein, there is illustrated schematically interactive steps between trusted component 260, proxy agent 511, proxy agent 514, and smart card 503, via smart card interface 255 and smart card reader 120 for copying of user files to reserved directories, and for continuous monitoring of sacrificial reserved files in the user space 504.

In step 1200, trusted component 260 requests the smart card, via agent 511, for an update of a user's data files. In step 1201, smart card 503 receives the request, which at this stage is unauthorized, and in response to receipt, in step 1202 sends a nonce to the agent 511 which is received by the agent in step 1203. The nonce may comprise a string of random bits created by smart card 503. The agent concatenates the request and the nonce, signs the concatenation, and sends the request and nonce and signature back to the smart card which is received by the smart card in step 1205 so that the smart card can verify that the trusted component is on-line. Smart card 503 uses its proxy agent 514 operating in user space on behalf of the smartcard and/or a pre-stored program on the smart card to make an inventory of the user's files and sends the inventory back to the trusted component in step 1208, after first verifying the request in step 1206 and constructing a file inventory which to send, in step 1207. The file inventory is received by agent 511 in step 1209. The trusted component 260 or the agent 511 uses the information on the file inventory by operating an algorithm to identify new or altered user files, and creates new directories in the reserved user space directories 512 allocated to the trusted component. The trusted component in step 1210 requests from the smart card or its proxy agent 514 copies of the new user files, and the smart card in step 1211 receives the request in step 1212. The smartcard or its proxy agent 514 copies the named user files into a memory space where the trusted component has read access, and then indicates in step 1213 that the copied files are ready for monitoring. In step 1214, the agent 511 ensures that the files are copied from the user space to the reserved directories allocated to the trusted component. The file names are renamed in step 1215, as previously described with reference to FIG. 11, and when agent 511 indicates that the files have been renamed, the smartcard and/or its agent 514 deletes the copied files from the memory space where the trusted component has read access. At this stage, files have been copied from user space to the reserved directories allocated to the trusted component, and then in step 1217 further read access to the agent 511 is denied by smart card 503. The agent then continues in step 1218 to compute file digests by applying the hash function to each individual file in the reserved directories in user space, which are then reported to the trusted component periodically as described previously. In step 1219 the trusted component stores the digests inside the trusted component, and generates the necessary error records if errors occur and generates alarms and reports to the monitor 105 and other entities as described previously herein with reference to FIGS. 10 and 11.

The file manipulation program 600 may optionally be stored within the trusted component as file manipulation program 704, so that instead of the agent 511 corresponding with the smart card and computer platform memory for copying and monitoring of files, this may be done from inside the trusted component in a variation of the embodiment.

Since the preferred embodiment herein operates by monitoring the data on a computer platform, there may be provided a system which is immune to variations of virus programs and new generations of viruses, but which is capable of detecting the effects of any virus which operates by changing data on a computer platform.

What is claimed is:

1. A method of security monitoring of a computing platform, said method comprising the steps of:
   (i) creating a data file in a portion of a memory area of said computing platform that is reserved for use by a trusted component associated with said computing platform;
   (ii) generating a first digest data describing a data content of said data file;
   (iii) waiting a predetermined time period;
   (iv) repeating step (ii) to generate a second digest data;
   (v) comparing said second digest data with said first digest data to determine a security status of the computing platform; and
   (vi) repeating steps (iii) to (vi) if said second digest data is identical to said first digest data.

2. The method as claimed in claim 1, further comprising the step of:
(vii) if said second digest data is not identical to said first digest data, storing an error data.

3. The method as claimed in claim 1, wherein said step of generating a first digest data comprises applying a hash function to said data file to produce a hash function data corresponding to said data file.

4. The method as claimed in claim 1, wherein said step of creating a data file in a reserved portion of a memory area of said computer platform comprises copying an existing user data file into the reserved portion of said memory area of said computer platform.

5. The method as claimed in claim 1, wherein said step of creating a data file in a reserved portion of said memory area comprises generating a random or pseudo random data in the reserved portion of said memory area of said computer platform.

6. The method as claimed in claim 1, wherein said step of generating a digest data corresponding to said data file is carried out by an algorithm operating on said computer platform.

7. The method as claimed in claim 1, wherein said step of generating a digest data comprises sending said data file to a trusted component comprising a trusted processor and a trusted memory area, and generating said digest data by applying an algorithm to said data file in said trusted component.

8. A computer entity comprising:
a computer platform comprising a first data processing means and a first memory means;
a monitoring component comprising a second data processing means and a second memory means;
wherein said monitoring component comprises means for receiving a monitor data, said monitor data describing a content of a plurality of data files stored in said computer platform in a portion of said first memory means that is reserved for use by a trusted component associated with said computer platform;
means for storing said plurality of monitor data in said monitoring component; and
means for making comparisons of said monitor data,
wherein said monitoring component periodically receives for each of a plurality of data files, a historical monitor data representing a state of said data file at a previous point in time, and a current monitor data representing a current state of said data file.

9. The computer entity as claimed in claim 8, wherein said historical monitor data and said current monitor data are stored in said second memory means of said monitoring component.

10. The computer entity as claimed in claim 8, wherein said monitoring component comprises a set of agent code stored in said second data storage means, wherein said set of agent code may be transferred to said first data storage means for operation and control by said first data processing means in said computer platform.

11. The computer entity as claimed in claim 8, wherein said monitoring component comprises a dictionary means, said dictionary means comprising a text generator device operable to generate a plurality of text data representing a plurality of words, and said monitoring means transferring said text data to a plurality of data files created in a reserved area of said first memory means.

12. The computer entity as claimed in claim 11, wherein said dictionary means is operable to generate a plurality of names identifying said plurality of data files created in said reserved area of said first memory means.

13. The computer entity as claimed in claim 11, wherein said dictionary means is operable to generate a plurality of names of directories containing said plurality of data files created in said reserved area of said first memory means.

14. The computer entity as claimed in claim 8, further comprising an agent means, said agent means resident and operating on said computer platform wherein,
said agent means creates a plurality of said data files in a reserved region of said first memory area;
said agent means substantially continuously monitors said created data files in said reserved memory region; and
said agent reports said monitor data describing a content of said data files in said reserved memory region periodically to said monitoring component.

15. The computer entity as claimed in claim 8, comprising a random data generator, wherein said random data generator generates random data which is stored in a plurality of said data files created in a reserved region of said first memory area of said computer platform.

16. The computer entity as claimed in claim 8, comprising an agent device resident on said computer platform, and a smart card reader device, wherein said agent device communicates with said smart card reader device for receiving a file name data from said smart card reader device, said file name data describing one or a plurality of file names of user data files for which permission to copy said user data files is granted to said agent device.

17. A method of security monitoring a computer platform comprising a first data processing means and a first memory means, said method comprising the steps of:
(i) receiving a first monitor data, said first monitor data describing a data content of a data file stored in a portion of a memory of said computer platform that is reserved for use by a trusted component associated with said computer platform;
(ii) storing said first monitor data in a trusted memory area physically and logically distinct from said computer platform;
(iii) receiving a second monitor data, said second monitor data describing a data content of said same data file stored in said computer platform;
(iv) comparing said first monitor data with said second monitor data;
(v) if said first monitor data differs from said second monitor data, generating an error data; and
(vi) if said first monitor data does not differ from said second monitor data, repeating steps (iii) to (vi).

18. The method as claimed in claim 17, further comprising the step of generating said first monitor data by applying a one-way function algorithm to a data content of said data file.

19. The method as claimed in claim 17, further comprising the step of:
generating an alarm display when a said error data is created.

20. The method as claimed in claim 17, further comprising the step of:
comparing said error data against a predetermined measure of error data allowable in a predetermined time, to determine if said error data is statistically significant.

21. The method as claimed in claim 20, further comprising the step of:
   if said error data is determined to be statistically significant, generating an alarm display indicating an error has occurred in said data file.

22. A method of monitoring a computer platform comprising a first data processing means and first memory means, said method comprising the steps of:
   a) allocating a region of said first memory means for use by a monitoring entity comprising a second data processing means and a second memory means;
   b) creating in said allocated memory area a plurality of data files, each allocated to said monitoring entity;
   c) entering data into said plurality of allocated data files in said reserved memory region;
   d) creating for each of said data files a monitor data describing a data content of each of said data file;
   e) storing said monitor data in a second memory device, said second memory device being physically and logically distinct from said first memory device;
   f) repeating steps d) and e); and
   g) periodically comparing a recently received said monitor data for said data file with a previously received monitor data for the same said data file.

23. The method as claimed in claim 22, wherein said step of entering data into a said data file comprises:
   copying an existing data file from an unreserved area of said first memory device into said data file.

24. The method as claimed in claim 23, further comprising the step of:
   assigning a file name of said data file in said reserved memory area said file name being a different file name to a file name of said original user file from said unreserved area of said first memory area from which said data file was copied.

25. The method as claimed in claim 23, further comprising the step of:
   assigning a directory name of a directory used for storing said data file in said reserved memory area said directory name being a different directory name to a directory name of said original user directory from said unreserved area of said first memory area in which said data file was originally located.

26. The method as claimed in claim 22, wherein said step of creating a monitor data comprises:
   applying a one-way function algorithm to data in said data file, to produce said monitor data from said data stored in said data file.

27. A computer entity programmed for security monitoring, comprising one or more processors and one or more memories, wherein:
   one of said processors is programmed to generate random or pseudo-random data files in of one of said memories reserved for use by a trusted component; and
   one of said processors is programmed to monitor said data files by repeatedly obtaining digests of said data files and detecting when changes to said data files have occurred.

28. A computer entity as claimed in claim 27 comprising at least two processors, wherein a first processor of said processors is a main processor and a second processor of said processors is a monitoring processor retained within a monitoring component physically and logically protected against unauthorised modification, wherein the monitoring processor is adapted to monitor said data files.

29. A computer entity as claimed in claim 28, wherein the computer entity comprises at least two memories, wherein a first memory of said memories is a main memory and a second memory of said memories is a monitor memory retained within the monitoring component, wherein the results of monitoring said data files are retained within the monitor memory.

30. A computer entity as claimed in claim 28, wherein the data files are generated by an agent operating on the main processor in coordination with code operating on the monitoring processor.

31. A computer entity as claimed in claim 27, wherein the data files are stored in a memory area reserved for monitoring purposes.

32. A computer entity as claimed in claim 27, wherein an error datum is generated when said monitoring indicates a change to one of said data files, and whereby said processor adapted to monitor said data files is adapted to report data corruption when a statistically significant number of said error data have been generated.

* * * * *